(12) United States Patent
Kim

(10) Patent No.: US 11,216,095 B2
(45) Date of Patent: Jan. 4, 2022

(54) HEAD-MOUNTED DISPLAY SYSTEM WITHOUT ADDITIONAL INPUT DEVICE

(71) Applicant: Samsung Display Co., Ltd., Yongin-Si (KR)

(72) Inventor: Minsoo Kim, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 16/009,718

(22) Filed: Jun. 15, 2018

(65) Prior Publication Data

US 2018/0373371 A1 Dec. 27, 2018

(30) Foreign Application Priority Data

Jun. 22, 2017 (KR) ........................ 10-2017-0079344

(51) Int. Cl.
*G06F 1/16* (2006.01)
*G06F 3/041* (2006.01)
(Continued)

(52) U.S. Cl.
CPC .......... *G06F 3/0412* (2013.01); *G06F 1/1643* (2013.01); *G06F 1/1652* (2013.01); *G06F 3/011* (2013.01); *G06F 3/012* (2013.01); *G06F 3/041* (2013.01); *G06F 3/04883* (2013.01); *G06F 3/04886* (2013.01); *G09G 3/001* (2013.01); *G09G 3/3233* (2013.01); *G09G 5/003* (2013.01); *G06F 1/163* (2013.01); *G06F 3/044* (2013.01); *G06F 3/165* (2013.01); *G06F 2203/04102* (2013.01); *G09G 2300/0819* (2013.01); *G09G 2320/0606* (2013.01);
(Continued)

(58) Field of Classification Search
CPC .......... G06F 1/163; G06F 2203/04102; G06F 3/012; G06F 3/041; G06F 3/0412; G06F 3/044; G06F 3/165; G09G 2300/0819; G09G 2320/0606; G09G 2320/0626; G09G 2340/0407; G09G 2354/00; G09G 2380/02; G09G 3/001; G09G 3/3233; G09G 5/003
See application file for complete search history.

(56) References Cited

U.S. PATENT DOCUMENTS 8,957,835 B2  2/2015  Hoellwarth
9,429,759 B2  8/2016  Hoellwarth
(Continued)

FOREIGN PATENT DOCUMENTS

CN   101551735 A   10/2009
CN   206074905 U    4/2017
EP     2960768 A1   12/2015

*Primary Examiner* — Ram A Mistry
(74) *Attorney, Agent, or Firm* — Cantor Colburn LLP

(57) ABSTRACT

A head-mounted display system may include a display device and a head-mounted device. The display device includes a touch screen surface exposed to an outside and including an active region which displays an image and senses a user input. The head-mounted device includes a frame, in which a reception space allowing the display device to be mounted therein is defined, and an optical system disposed in the frame. The active region of the display device includes a first active region, which is exposed to the outside and receives the user input for controlling the head-mounted device, when the display device is coupled with the head-mounted device.

19 Claims, 27 Drawing Sheets

(51) Int. Cl.
*G09G 5/00* (2006.01)
*G06F 3/01* (2006.01)
*G09G 3/00* (2006.01)
*G06F 3/0488* (2013.01)
*G09G 3/3233* (2016.01)
*G06F 3/16* (2006.01)
*G06F 3/044* (2006.01)

(52) U.S. Cl.
CPC .............. *G09G 2320/0626* (2013.01); *G09G 2340/0407* (2013.01); *G09G 2354/00* (2013.01); *G09G 2380/02* (2013.01)

(56) References Cited

U.S. PATENT DOCUMENTS

| | | |
|---|---|---|
| 9,482,869 B2 | 11/2016 | Hoellwarth |
| 9,646,574 B2 | 5/2017 | Hoellwarth |
| 10,191,573 B2 | 1/2019 | Mori et al. |
| 2014/0267637 A1* | 9/2014 | Hoberman ............ G06F 1/1626 348/53 |
| 2015/0253574 A1 | 9/2015 | Thurber |
| 2016/0085076 A1* | 3/2016 | Hoellwarth .......... G02B 27/017 455/566 |

\* cited by examiner

HEAD-MOUNTED DISPLAY SYSTEM WITHOUT ADDITIONAL INPUT DEVICE

This application claims priority to Korean Patent Application No. 10-2017-0079344, filed on Jun. 22, 2017, and all the benefits accruing therefrom under 35 U.S.C. § 119, the content of which in its entirety is herein incorporated by reference.

BACKGROUND

1. Field

The disclosure relates to a head-mounted display system, and in particular, to a system including a display device and a head-mounted device combined with each other.

2. Description of the Related Art

A head-mounted device is typically configured to be mounted on a head of a user and may include or be combined with a display panel unit. The head-mounted device may be used to realize an augmented reality or a virtual reality. In the head-mounted device for realizing the augmented reality, a semitransparent display device may be used to provide a virtual graphic image to a user. In this case, both of the virtual graphic image and a real object may be recognized by the user. In the head-mounted device for realizing the virtual reality, a virtual graphic image may be provided to eyes of a user. In this case, the user may experience a virtual reality through virtual contents.

A manipulation part for controlling volume or screen brightness is typically provided on an exterior of a head-mounted device. The manipulation part is typically provided in the form of a physical button or a touch sensor.

SUMMARY

Embodiments of the invention provide a head-mounted device configured to be controlled without an additional input device.

According to an embodiment of the invention, a head-mounted display system may include a display device and a head-mounted device. In such an embodiment, the display device includes a touch screen surface exposed to an outside, and the touch screen surface includes an active region which displays an image on the touch screen surface and senses a user input. In such an embodiment, the head-mounted device includes a frame, in which a reception space allowing the display device to be mounted therein is defined, and an optical system disposed in the frame. In such an embodiment, when the display device is coupled with the head-mounted device, the active region of the display device includes a first active region, which is exposed to the outside and receives the user input for controlling the head-mounted device.

In an embodiment, the active region may further include a second active region inserted in the reception space. In such an embodiment, the second active region may include an image display region, which displays an image to be provided to a user.

In an embodiment, when the display device is coupled with the head-mounted device, the first active region may not display an image, and the second active region may display an image.

In an embodiment, when the display device is coupled with the head-mounted device, the first active region may sense the user input, and the second active region may not sense the user input.

In an embodiment, the user input, which is input to the first active region, may control at least one of volume of the head-mounted device, screen brightness of the head-mounted device, resolution of the head-mounted device, a focal length of the optical system, an image to be displayed on the display, and an assist device interlocked with the head-mounted device.

According to another embodiment of the invention, a head-mounted display system may include a display device and a head-mounted device. In such an embodiment, the display device displays an image and senses a user input. In such an embodiment, the head-mounted device includes a frame, in which a reception space allowing the display device to be mounted therein is defined, and an optical system disposed in the frame. In such an embodiment, when the display device is coupled with the head-mounted device, the head-mounted device is controlled based on the user input, which is input to the display device.

BRIEF DESCRIPTION OF THE DRAWINGS

The above and other advantages features of the invention will become readily apparent by reference to the following detailed description when considered in conjunction with the accompanying drawings, in which.

DETAILED DESCRIPTION

Figure 1:
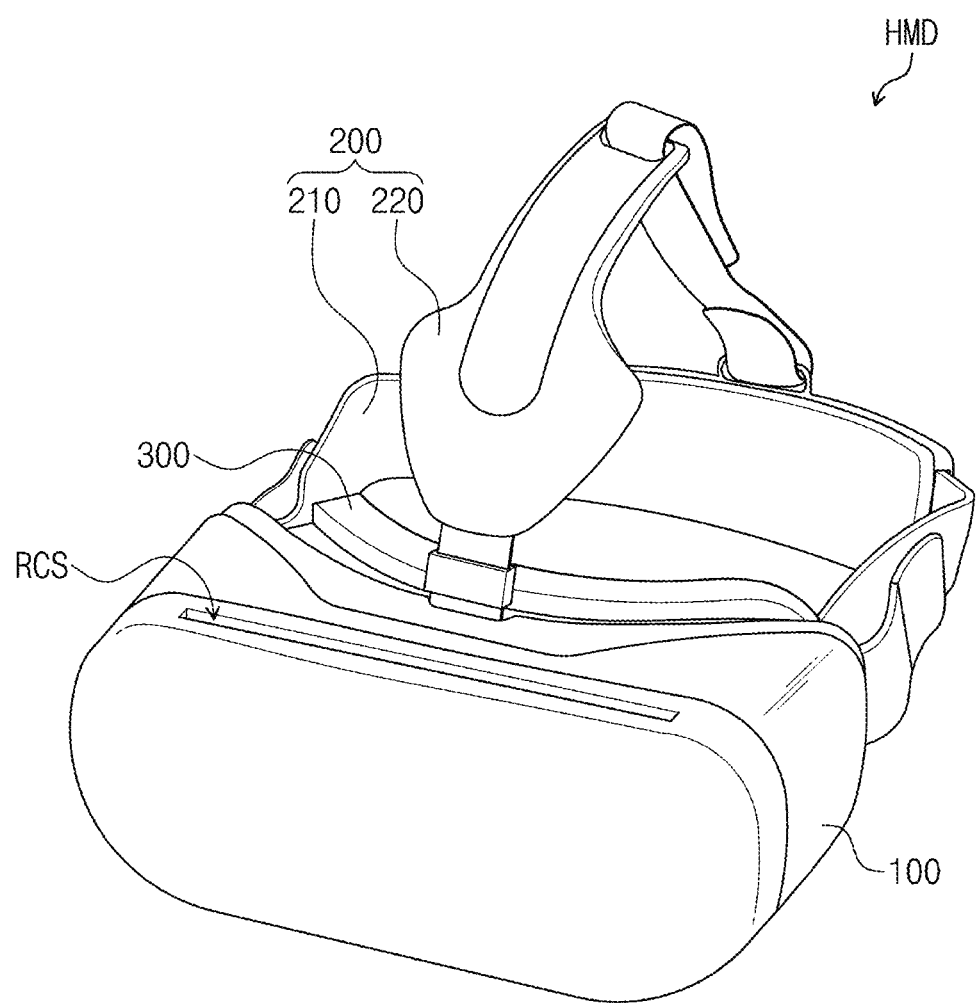
FIG. 1 is a perspective view illustrating a head-mounted device according to an embodiment of the invention.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the disclosure, and will not be interpreted in an idealized or overly formal sense unless expressly so defined herein.

Figure 2:
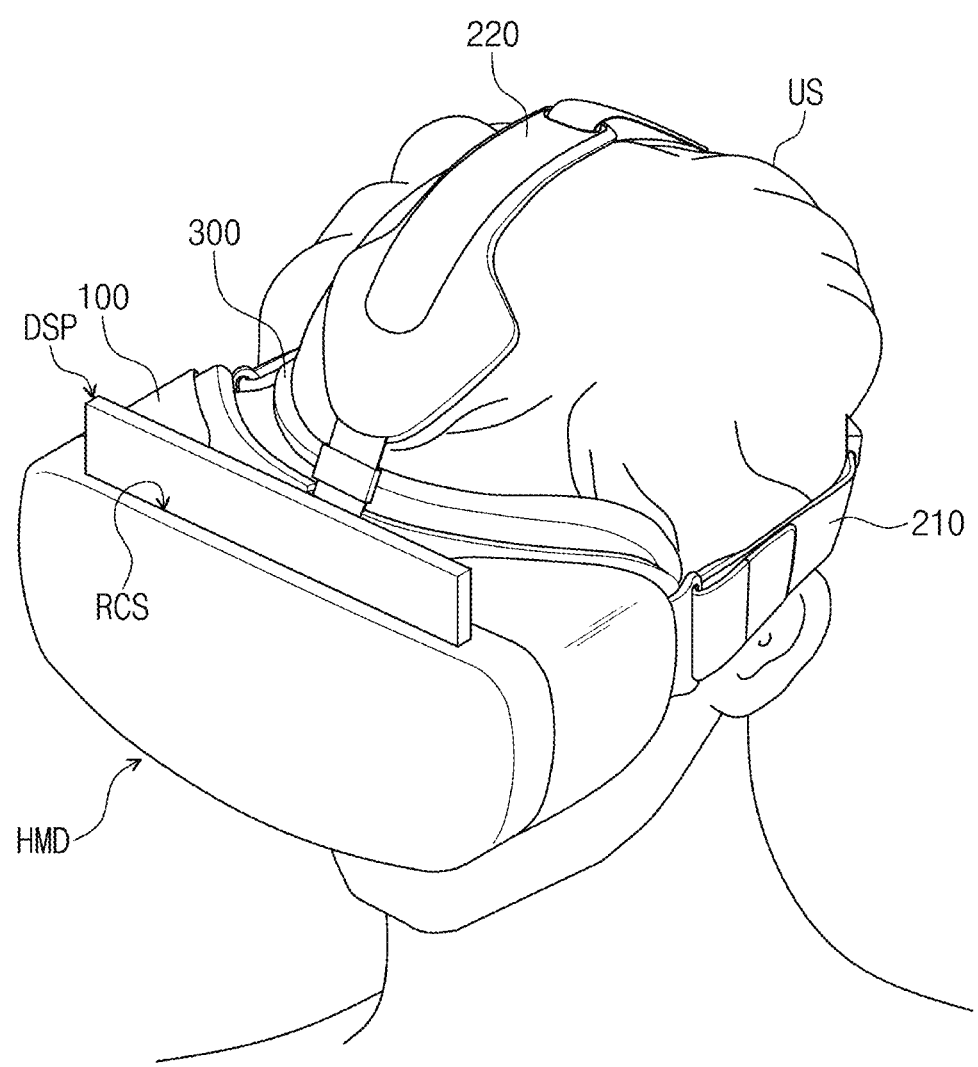
FIG. 2 is a diagram showing a combined structure of a head-mounted device and a display device in use, according to an embodiment of the invention.

FIG. 1 is a perspective view illustrating a head-mounted device according to an embodiment of the invention, and FIG. 2 is a diagram showing a combined structure of a head-mounted device and a display device on a user, according to an embodiment of the invention.

Referring to FIGS. 1 and 2, an embodiment of a head-mounted device HMD may be a device that may be mounted or worn on a head of a user US. The head-mounted device HMD may be configured to display an image on a display device DSP to be viewed by the user US, while effectively preventing an image of a peripheral region of the real world from being recognized by the user US. In a state where the user US wears the head-mounted device HMD, the user US may be more easily immersed in the virtual reality and/or the augmented reality realized through the display device DSP.

The display device DSP may be configured to display an image and to sense a touch input. The display device DSP may include, for example, at least one of smart phones, tablet personal computers ("PC"s), mobile phones, e-book readers, note books, personal digital assistants ("PDA"s), portable multimedia players ("PMP"s), MP3 players, mobile medical instruments, cameras, or wearable display devices.

The head-mounted device HMD may include a frame 100, a support member 200, and a cushion member 300.

The frame 100 may be configured to be worn on the head of the user US. The frame 100 may provide a reception space RCS, in which the display device DSP may be mounted or inserted. In such an embodiment, when the display device DSP is mounted in the frame 100, a portion of the display device DSP may be exposed to an outside. The exposed portion of the display device DSP may allow the user US to control the head-mounted device HMD. This will be described in greater detail below.

The head-mounted device HMD may be configured to communicate with the display device DSP. In an embodiment, the frame 100 may include a connector provided therein, and when the display device DSP is mounted in the frame 100, the connector may be physically connected to an input terminal of the display device DSP. However, the invention is not limited thereto. In an alternative embodiment, the head-mounted device HMD and the display device DSP may be configured to exchange wireless signals using near field communication. In such an embodiment, a communication module may be provided in each of the frame 100 and the display device DSP.

Components or parts for realizing various functions may be provided in the frame 100. In one embodiment, for example, an acceleration sensor (not shown) may be disposed in the frame 100. The acceleration sensor may be configured to detect motion of the user US and to transmit a signal, which contains information on the motion of the user US, to the display device DSP such that the display device DSP is allowed to create an image corresponding to a change in viewpoint of the user US, and the image may be effectively provided to the user US through the display device DSP. In one embodiment, for example, a proximity sensor (not shown) may be disposed in the frame 100. The proximity sensor may be configured to determine whether the user US wears the head-mounted device HMD.

The support member 200 may be combined with the frame 100 to allow the user US to easily wear the frame 100. In an embodiment, as shown in FIGS. 1 and 2, the support member 200 may include a main strap 210 and an upper strap 220.

The main strap 210 may be configured to be disposed along the circumference of the head of the user US, when the user US wears the head-mounted device HMD. The main strap 210 may be configured to fasten the frame 100 to the user US or to allow the frame 100 to be in close contact with the head of the user US. The upper strap 220 may connect the frame 100 to the main strap 210 along an upper portion of the head of the user US. The upper strap 220 may effectively prevent the frame 100 from being moved in a downward direction, and the upper strap 220 may distribute a weight of the frame 100, thereby improving comfort in wearing the head-mounted device HMD.

In an embodiment, as shown in FIG. 1, the main strap 210 and the upper strap 220 may be configured to have adjustable lengths, but the invention is not limited thereto. In one alternative embodiment, for example, at least one of the main strap 210 and the upper strap 220 may be configured to have an elastic property, and in such an embodiment, the length-adjustable parts may be omitted from at least one of the main strap 210 and the upper strap 220.

In an embodiment, where the support member 200 is used to fasten the frame 100 to the user US, the shape of the support member 200 may be variously changed from that shown in FIGS. 1 and 2. In one alternative embodiment, for example, the upper strap 220 may be omitted. In another alternative embodiment, the support member 200 may be provided in various forms, such as a helmet or temple coupled with the frame 100.

The cushion member 300 may be provided between the frame 100 and the head of the user US. The cushion member 300 may include or be formed of a material that is deformable in shape. In one embodiment, for example, the cushion member 300 may include or be formed of at least one of polymer resins (e.g., polyurethane, polycarbonate, polypropylene, and polyethylene), rubber, urethane materials, and acrylic materials, and the cushion member 300 may be provided in the form of a foamed sponge. However, the invention is not limited thereto.

The cushion member 300 may be configured to allow the frame 100 to be in close contact with the user US, to improve the comfort in wearing the head-mounted device HMD. The cushion member 300 may be configured to be detachable from the frame 100. In an alternative embodiment, the cushion member 300 may be omitted.

Figure 3:
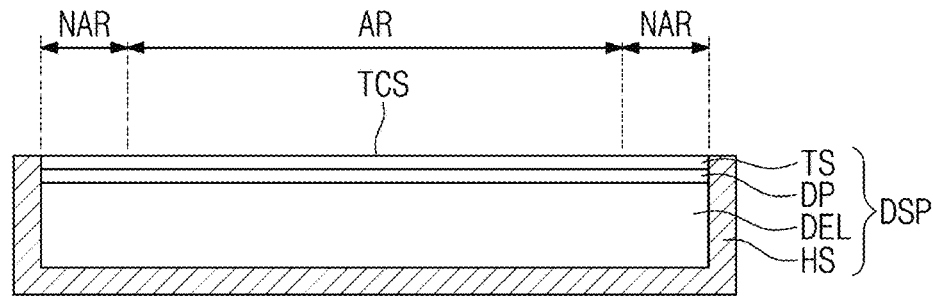
FIG. 3 is a cross-sectional side view illustrating a display device according to an embodiment of the invention.

FIG. 3 is a cross-sectional side view illustrating a display device according to an embodiment of the invention.

Referring to FIG. 3, an embodiment of the display device DSP may include a display panel DP, an input sensing unit TS, a driving device structure DEL, and a housing HS.

In an embodiment, the display device DSP may include a touch screen surface TCS. The touch screen surface TCS may define the outermost surface of the display device DSP, which is exposed to the outside, and thus, the touch screen surface TCS may be used to display an image to a user and to receive a touch or hovering input from the user. In an embodiment, as shown in FIG. 3, the touch screen surface TCS may be defined by a top surface of the input sensing unit TS, but the invention is not limited thereto. In one alternative embodiment, for example, a window, an optical film or the like may be further provided on the input sensing unit TS, and in such an embodiment, the window, the optical film or the like may define the touch screen surface TCS.

When viewed in a plan view, the touch screen surface TCS may be divided into an active region AR and a non-active region NAR adjacent to the active region AR. The active region AR of the touch screen surface TCS may be used to display an image and to sense a user input. The user input may be a touch input (a touch by a finger or stylus pen) or a hovering input. For convenience of description, embodiments, in which the user input is the touch input, will hereinafter be described in detail.

The display panel DP may include one of various types of display panels, such as an organic light emitting display panel, a liquid crystal display panel, a plasma display panel, an electrophoresis display panel, and an electrowetting display panel. For convenience of description, embodiments, in which the display panel DP is an organic light emitting display panel, will be described in detail, but the invention is not limited thereto.

The display panel DP may be configured to display an image on the active region AR, but not on the non-active region NAR.

The input sensing unit TS may be disposed on the display panel DP. The input sensing unit TS may be configured to sense a touch input and to obtain coordinate information on a position of the touch input. In an embodiment, the input sensing unit TS and the display panel DP may be integrally fabricated as a single panel or module through a consecutive process. However, the invention is not limited thereto, and in an alternative embodiment, the input sensing unit TS may be manufactured as an independent module and then may be attached to the display panel DP by an additional adhesive layer.

In the input sensing unit TS, the active region AR may be used to sense a user input, but the non-active region NAR may not be used to sense a user input. However, in an alternative embodiment, where the structure or arrangement of pixels in the display panel DP and the structure or arrangement of electrodes in the input sensing unit TS are modified, a portion of the non-active region NAR adjacent to the active region AR may also be used to sense a touch input or an external input.

In an embodiment, the input sensing unit TS may be implemented in a capacitive manner. However, the invention is not limited thereto, and in an alternative embodiment, the input sensing unit TS may be implemented in an electromagnetic induction manner or a pressure-sensing manner.

The housing HS may be configured to contain the display panel DP and the input sensing unit TS therein. The housing HS may define an exterior appearance of the display device DSP. The housing HS may provide a space, in which electronic components may be disposed.

The driving device structure DEL may be disposed in the housing HS and below the display panel DP. The driving device structure DEL may include various components, which may be included for operating the display device DSP, e.g., a main printed circuit board ("PCB"), a memory device, a battery and so forth.

Figure 4:
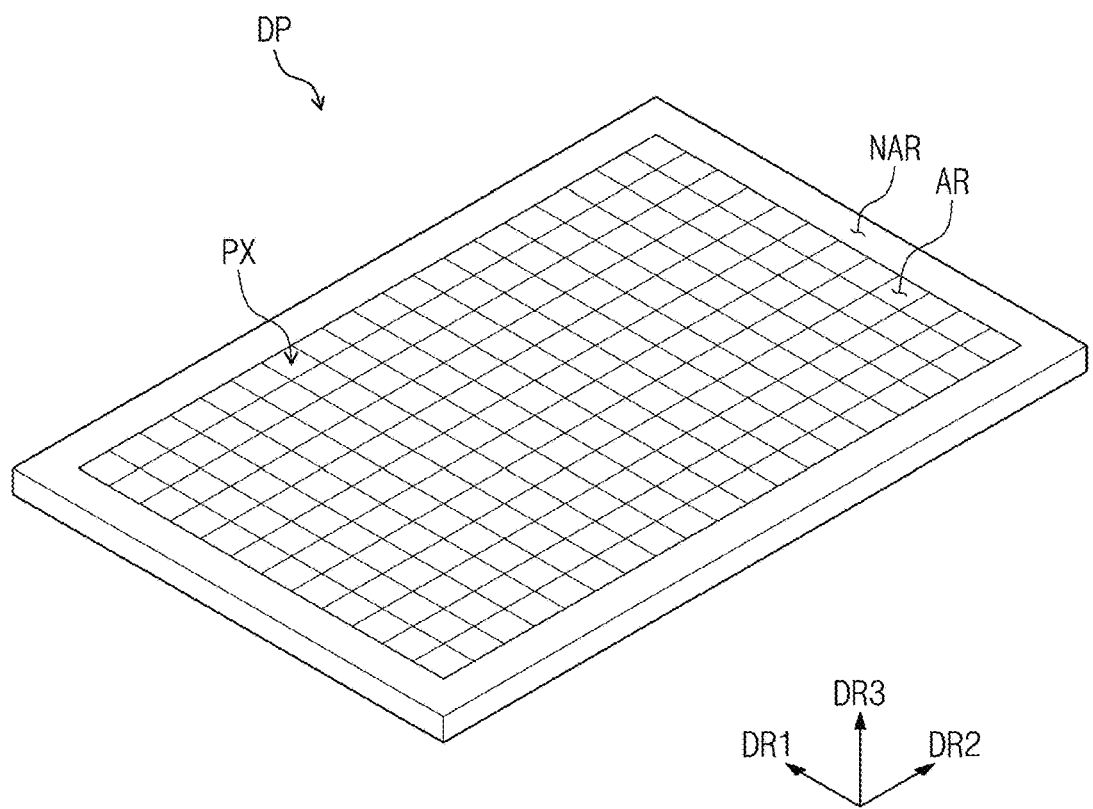
FIG. 4 is a perspective view illustrating a display panel.
Figure 5:
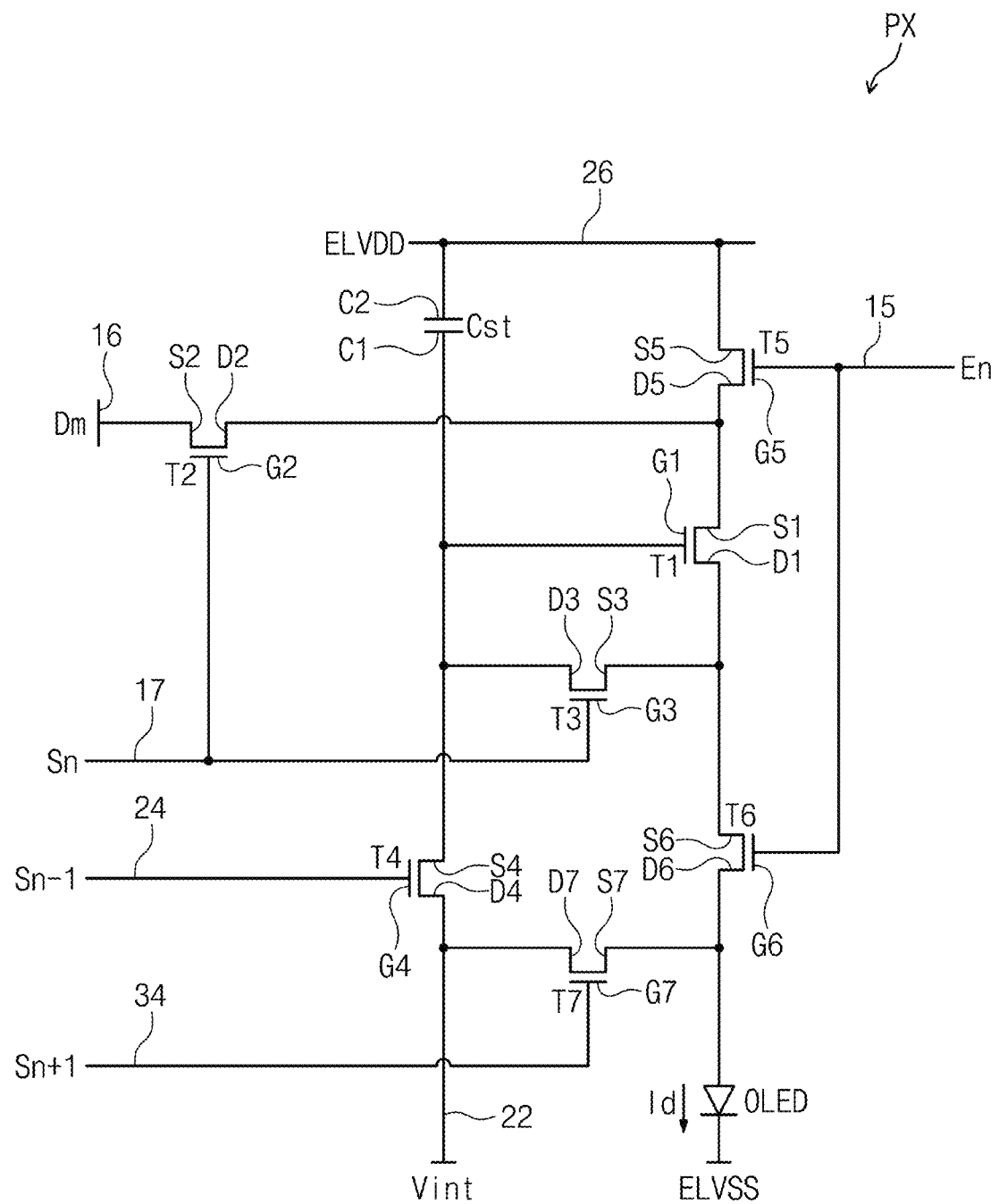
FIG. 5 is an equivalent circuit diagram of one of pixels shown in FIG. 4.

FIG. 4 is a perspective view illustrating a display panel, and FIG. 5 is an equivalent circuit diagram of one of pixels shown in FIG. 4.

Referring to FIGS. 4 and 5, a plurality of pixels PX may be disposed in the active region AR of the display panel DP. The pixels PX may not be provided in the non-active region NAR of the display panel DP. FIG. 4 illustrates an embodiment, where the plurality of the pixels PX is arranged in a matrix shape, but the invention is not limited thereto. In one alternative embodiment, for example, the pixels PX may be arranged in a non-matrix shape (e.g., in a pentile pattern).

The display panel DP may have short sides extending in a first direction DR1 and long sides extending in a second direction DR2. A thickness direction of the display panel DP may be defined as a direction parallel to a third direction DR3.

According to an embodiment of the invention, as shown in FIG. 5, each of the pixels PX may include a plurality of transistors T1-T7, a storage capacitor Cst, and an organic light emitting device OLED.

The thin-film transistors T1-T7 of a pixel PX may include a driving transistor T1, a switching transistor T2, a compensation transistor T3, an initialization transistor T4, a first light-emitting control transistor T5, a second light-emitting control transistor T6, and a bypass transistor T7.

The pixel PX may include a first scan line 17, a second scan line 24, a third scan line 34, a light-emitting line 15, a data line 16, a power line 26, and an initialization line 22. In an embodiment, the first scan line 17 may transmit an n-th scan signal Sn to the switching transistor T2 and the compensation transistor T3, the second scan line 24 may transmit an (n−1)-th scan signal Sn−1 to the initialization transistor T4, the third scan line 34 may transmit an (n+1)-th scan signal Sn+1 to the bypass transistor T7, the light-emitting line 15 may transmit a light-emitting control signal En to the first light-emitting control transistor T5 and the second light-emitting control transistor T6, the data line 16 may transmit a data signal Dm, the power line 26 may transmit a power voltage ELVDD, and the initialization line 22 may transmit an initialization voltage Vint for initializing the driving transistor T1.

In such an embodiment, a gate electrode G1 of the driving transistor T1 may be connected to a first electrode C1 of the storage capacitor Cst. A source electrode S1 of the driving transistor T1 may be connected to the power line 26 via the first light-emitting control transistor T5. A drain electrode D1 of the driving transistor T1 may be electrically connected to an anode of the organic light emitting device OLED via the second light-emitting control transistor T6. The driving transistor T1 may receive the data signal Dm, depending on a switching operation of the switching transistor T2, and supply a driving current Id to the organic light emitting device OLED.

A gate electrode G2 of the switching transistor T2 may be connected to the first scan line 17. A source electrode S2 of the switching transistor T2 may be connected to the data line 16. A drain electrode D2 of the switching transistor T2 may be connected to the source electrode S1 of the driving transistor T1, and may be connected to the power line 26 via the first light-emitting control transistor T5. When the n-th scan signal Sn is transmitted to the switching transistor T2 through the first scan line 17, the switching transistor T2 may be turned on, thereby executing a switching operation of transmitting the data signal Dm of the data line 16 to the source electrode S1 of the driving transistor T1.

A gate electrode G3 of the compensation transistor T3 may be connected to the first scan line 17. A source electrode S3 of the compensation transistor T3 may be connected to the drain electrode D1 of the driving transistor T1 and may be connected to the anode of the organic light emitting device OLED via the second light-emitting control transistor T6. A drain electrode D3 of the compensation transistor T3 may be connected to the first electrode C1 of the storage capacitor Cst, a source electrode S4 of the initialization transistor T4 and the gate electrode G1 of the driving transistor T1. When the n-th scan signal Sn is transmitted to the compensation transistor T3 through the first scan line 17, the compensation transistor T3 may be turned on to electrically connect the gate electrode G1 and the drain electrode D1 of the driving transistor T1 to each other. Accordingly, In such an embodiment, the driving transistor T1 may function as a diode.

A gate electrode G4 of the initialization transistor T4 may be connected to the second scan line 24. A drain electrode D4 of the initialization transistor T4 may be connected to the initialization line 22. The source electrode S4 of the initialization transistor T4 may be connected to the first electrode C1 of the storage capacitor Cst, the drain electrode D3 of the compensation transistor T3, and the gate electrode G1 of the driving transistor T1. When the (n−1)-th scan signal Sn−1 is transmitted to the initialization transistor T4 through the second scan line 24, the initialization transistor T4 may be turned on to allow the initialization voltage Vint to be transmitted to the gate electrode G1 of the driving transistor T1, thereby initializing a voltage of the gate electrode G1 of the driving transistor T1.

A gate electrode G5 of the first light-emitting control transistor T5 may be connected to the light-emitting line 15. The first light-emitting control transistor T5 may be connected between the power line 26 and the driving transistor T1. A source electrode S5 of the first light-emitting control transistor T5 may be connected to the power line 26. A drain electrode D5 of the first light-emitting control transistor T5 may be connected to the source electrode S1 of the driving transistor T1 and the drain electrode D2 of the switching transistor T2. When the light-emitting control signal En is applied to the gate electrode G5 of the first light-emitting control transistor T5, the first light-emitting control transistor T5 may be turned on to allow the driving current Id to flow through the organic light emitting diode OLED. Accordingly, in such an embodiment, the first light-emitting control transistor T5 may determine timing of the driving current Id flowing through the organic light emitting diode OLED based on the light-emitting control signal En.

A gate electrode G6 of the second light-emitting control transistor T6 may be connected to the light-emitting line 15. The second light-emitting control transistor T6 may be connected between the driving transistor T1 and the organic light emitting diode OLED. A source electrode S6 of the second light-emitting control transistor T6 may be connected to the drain electrode D1 of the driving transistor T1 and the source electrode S3 of the compensation transistor T3. A drain electrode D6 of the second light-emitting control transistor T6 may be electrically connected to the anode of the organic light emitting device OLED. The first light-emitting control transistor T5 and the second light-emitting control transistor T6 may be turned on by the light-emitting control signal En transmitted through the light-emitting line 15. When the light-emitting control signal En is applied to the gate electrode G6 of the second light-emitting control transistor T6, the second light-emitting control transistor T6 may be turned on to allow the driving current Id to flow through the organic light emitting device OLED. Accordingly, in such an embodiment, the second light-emitting control transistor T6 determine the timing of the driving current Id flowing through the organic light emitting diode OLED based on the light-emitting control signal En.

A gate electrode G7 of the bypass transistor T7 may be connected to the third scan line 34. A source electrode S7 of the bypass transistor T7 may be connected to the anode of the organic light emitting device OLED. A drain electrode D7 of the bypass transistor T7 may be connected to the initialization line 22. The bypass transistor T7 may be turned on by the (n+1)-th scan signal Sn+1 transmitted through the third scan line 34 to initialize the anode of the organic light emitting device OLED.

A second electrode C2 of the storage capacitor Cst may be connected to the power line 26. The first electrode C1 of the storage capacitor Cst may be connected to the gate electrode G1 of the driving transistor T1, the drain electrode D3 of the compensation transistor T3, and the source electrode S4 of the initialization transistor T4.

A cathode of the organic light emitting device OLED may receive a reference voltage ELVSS. The organic light emitting device OLED may emit light using the driving current Id provided from the driving transistor T1.

In an alternative embodiment, the number and the connection structure of the transistors T1-T7 constituting the pixel PX may be variously modified.

Figure 6:
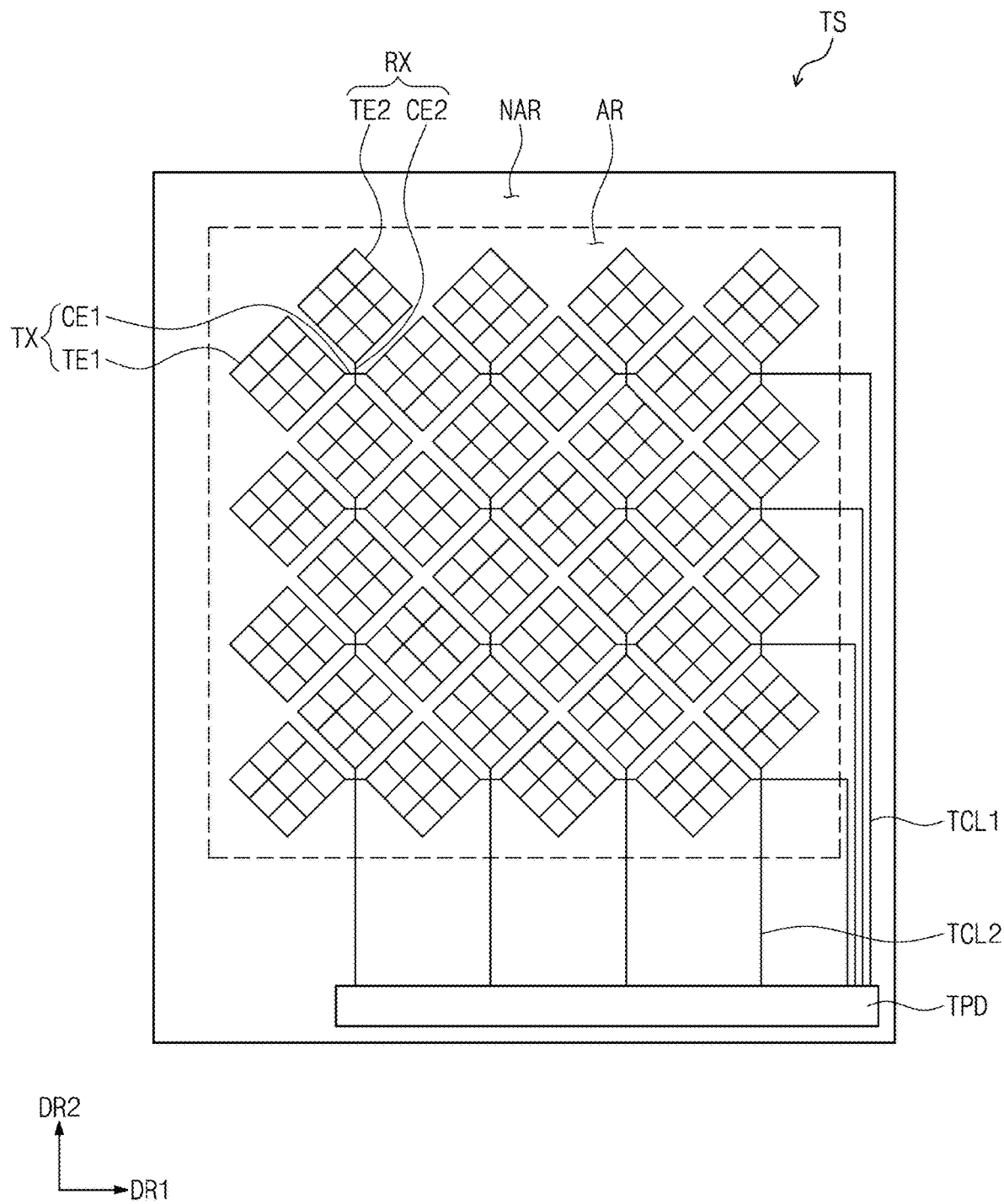
FIG. 6 is a plan view illustrating an input sensing unit of FIG. 3.

FIG. 6 is a plan view illustrating an input sensing unit of FIG. 3.

Hereinafter, embodiments in which the input sensing unit TS is configured to sense a touch input of a user or an external input in a mutual-capacitance manner (i.e., using two or more conductive layers that are electrically disconnected from each other), for convenience of description. However, the invention is not limited thereto, and in alternative embodiments, the input sensing unit TS may be configured to sense a touch input of a user or an external input in a self-capacitance manner (i.e., using a single conductive layer).

In an embodiment, the input sensing unit TS may include first touch lines TX and second touch lines RX, which are disposed to cross each other and are insulated from each other.

The first touch lines TX and the second touch lines RX may be disposed in the active region AR. The first touch lines TX may extend in the first direction DR1 and may be spaced apart from each other in the second direction DR2. The second touch lines RX may extend in the second direction DR2 and may be spaced apart from each other in the first direction DR1.

The first touch lines TX and the second touch lines RX may sense a touch input of a user, based on a change in capacitance therebetween.

The first touch lines TX may include a first touch electrode TE1 and a first connection electrode CE1. The first connection electrode CE1 may connect the first touch electrodes TE1, which are arranged adjacent to each other in the first direction DR1.

The second touch lines RX may include a second touch electrode TE2 and a second connection electrode CE2. The second connection electrode CE2 may connect the second touch electrodes TE2, which are arranged adjacent to each other in the second direction DR2.

In an embodiment, as shown in FIG. 6, each of the first touch electrode TE1 and the second touch electrode TE2 may have a mesh shape. However, the invention is not limited thereto, and in an alternative embodiment, the first touch electrode TE1 and the second touch electrode TE2 may be transparent electrodes. In another alternative embodiment, each of the first touch lines TX and the second touch lines RX may have a linear shape.

The input sensing unit TS may further include a touch pad TPD, a first trace line TCL1, and a second trace line TCL2.

The touch pad TPD may be disposed in the non-active region NAR.

The first trace line TCL1 may connect the first touch lines TX to the touch pad TPD, and the second trace line TCL2 may connect the second touch lines RX to the touch pad TPD.

The touch pad TPD may provide or receive a first touch signal to or from the first touch lines TX through the first trace lines TCL1. The touch pad TPD may provide or receive a second touch signal to or from the second touch lines RX through the second trace lines TCL2.

Figure 7:
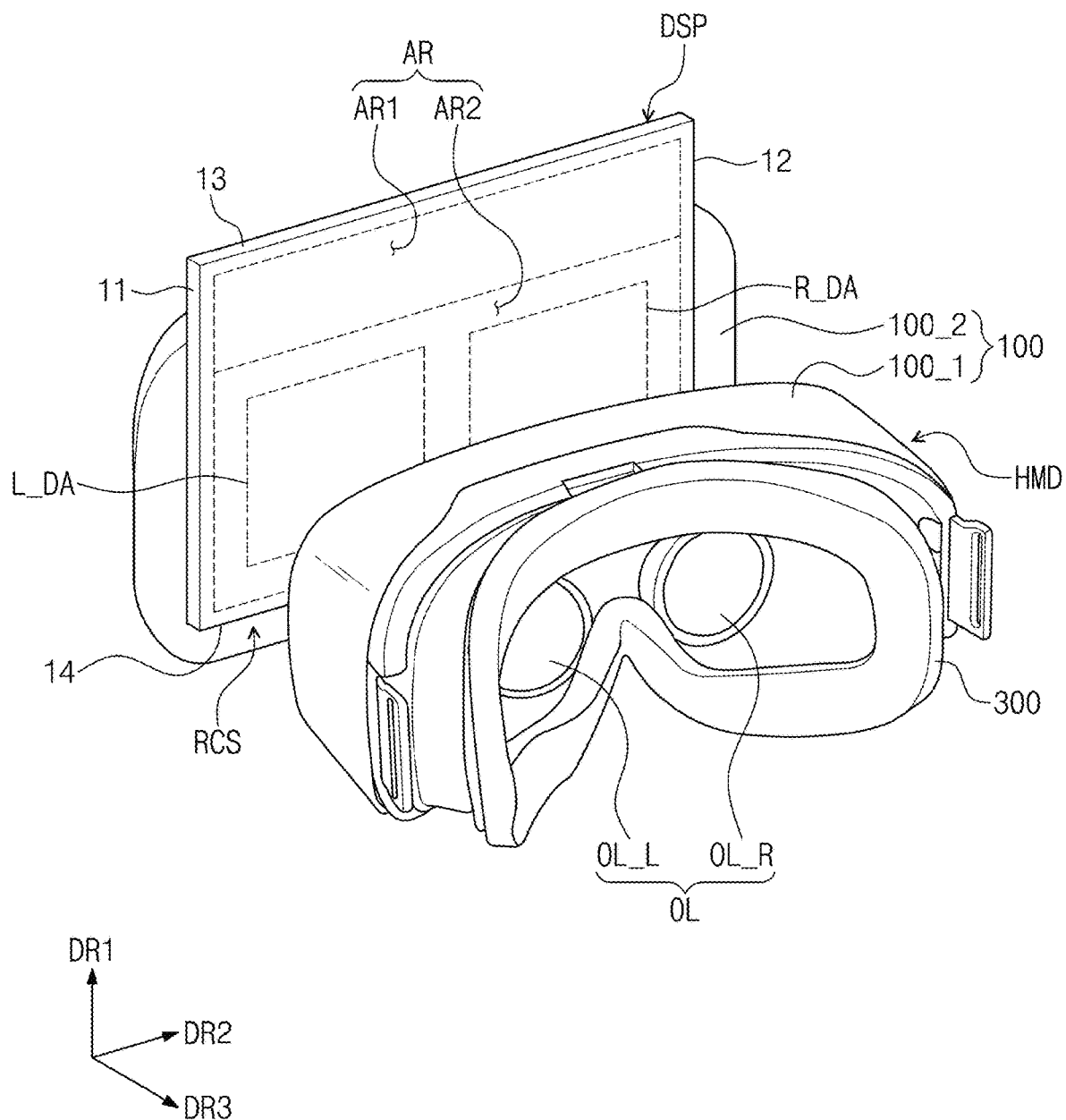
FIG. 7 is an exploded perspective view illustrating a partially-exploded structure of a display device and a head-mounted device, according to an embodiment of the invention.
Figure 8:
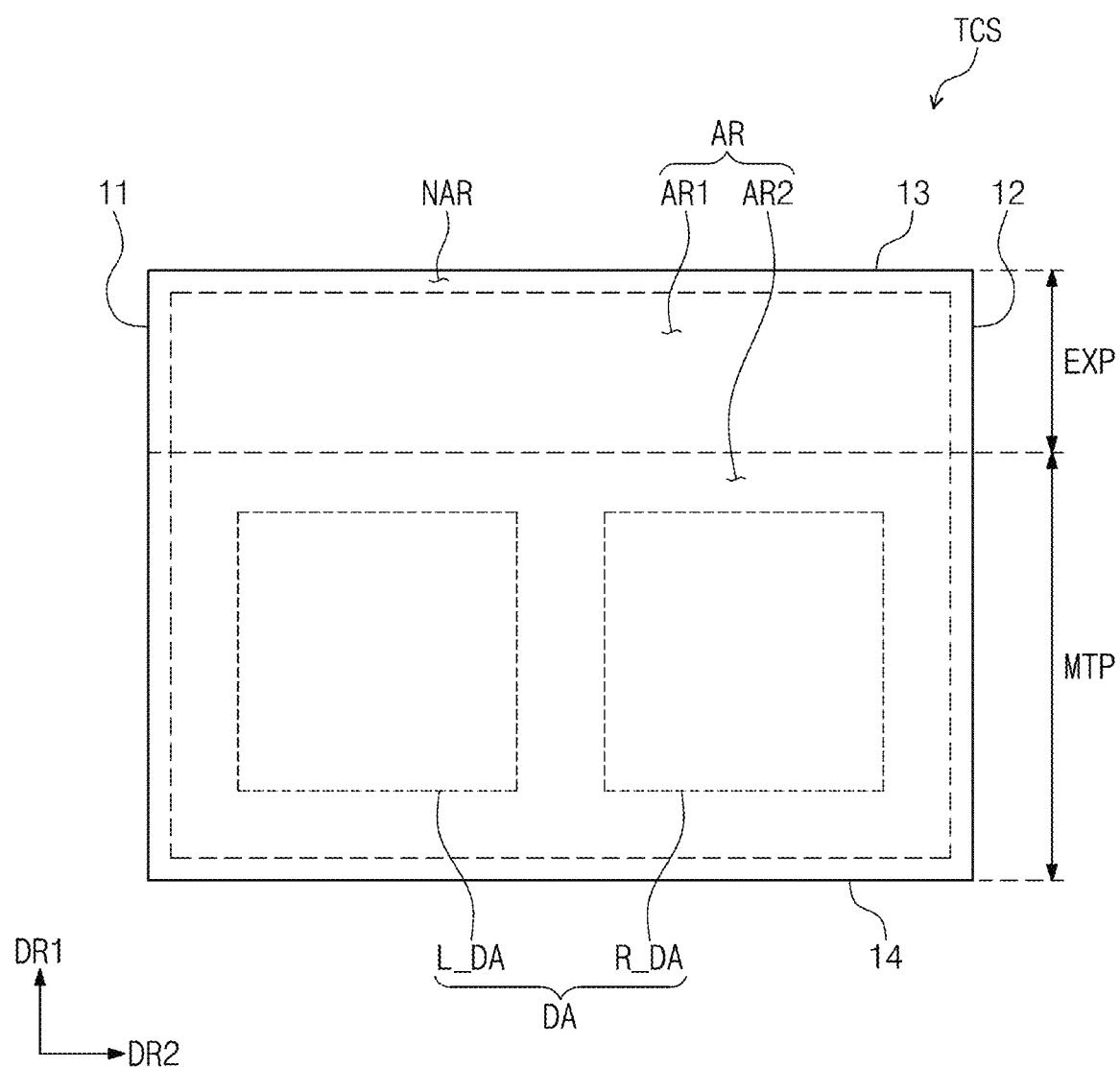
FIG. 8 is a plan view illustrating a touch screen surface of a display device.

FIG. 7 is an exploded perspective view illustrating a partially-exploded structure of a display device and a head-mounted device, according to an embodiment of the invention, and FIG. 8 is a plan view illustrating a touch screen surface of a display device. For convenience of illustration and description, the support member 200 of FIG. 1 is omitted from FIG. 7.

Referring to FIG. 7, in an embodiment, the frame 100 may include a main frame 100_1 and a cover portion 100_2.

The reception space RCS may be defined between the main frame 100_1 and the cover portion 100_2, and the display device DSP may be disposed or mounted in the reception space RCS. In an embodiment, a portion of the display device DSP may be mounted in the reception space RCS.

In an embodiment, as shown in FIG. 7, the cover portion 100_2 may be configured to cover at least a portion of a rear surface of the display device DSP. The cover portion 100_2 may be coupled to the main frame 100_1 by a mechanical means, such as a hook, or using a magnet or electromagnet, for example. The cover portion 100_2 may be configured to prevent the display device DSP from being departed from the main frame 100_1, to constitute the exterior appearance of the head-mounted device HMD, and to improve an esthetic sense on the exterior appearance of the head-mounted device HMD. In an embodiment, as shown in FIG. 7, the main frame 100_1 and the cover portion 100_2 may be separated from each other, but the invention is not limited thereto. In one alternative embodiment, for example, the main frame 100_1 and the cover portion 100_2 may be connected to each other to integrally form a single unitary body or an indivisible unit.

The head-mounted device HMD may further include an optical system OL.

The optical system OL may be disposed in the main frame 100_1. The optical system OL may be configured to magnify an image provided from the display device DSP.

The optical system OL may be spaced apart from the display device DSP in the third direction DR3. In an embodiment, as shown in FIG. 2, the optical system OL may be disposed between the display device DSP and a user US.

The optical system OL may include a right-eye optical system OL_R and a left-eye optical system OL_L. The left-eye optical system OL_L may be configured to provide a magnified image to a left pupil of the user US, and the right-eye optical system OL_R may be configured to provide a magnified image to a right pupil of the user US.

The left-eye optical system OL_L and the right-eye optical system OL_R may be spaced apart from each other in the second direction DR2. In an embodiment, a distance between the right-eye optical system OL_R and the left-eye optical system OL_L may be adjusted based on a distance between two eyes of the user US. In such an embodiment, a distance between the optical system OL and the display device DSP may be adjusted based on a visual acuity of the user US.

The optical system OL may be a convex aspheric lens. In an embodiment, as shown in FIG. 7, each of the left-eye optical system OL_L and the right-eye optical system OL_R may be defined by only one lens, but the invention is not limited thereto. In one alternative embodiment, for example, each of the left-eye optical system OL_L and the right-eye optical system OL_R may be configured to include a plurality of lens.

Referring to FIGS. 7 and 8, in an embodiment, the touch screen surface TCS of the display device DSP may be flat. The touch screen surface TCS of the display device DSP may have short sides 11 and 12, which extend in the first direction DR1 and are spaced apart from each other in the second direction DR2 crossing the first direction DR1. In such an embodiment, the touch screen surface TCS of the display device DSP may have long sides 13 and 14, which extend in the second direction DR2 and are spaced apart from each other in the first direction DR1. The short sides 11 and 12 of the touch screen surface TCS may be longer than a depth of the reception space RCS in the first direction DR1. In a state where the display device DSP is mounted in the frame 100, the display device DSP may be disposed between the main frame 100_1 and the cover portion 100_2 in the third direction DR3 crossing both of the first and second directions DR1 and DR2.

In an embodiment, when the display device DSP is coupled with the head-mounted device HMD, the touch screen surface TCS may include an exposed portion EXP, which is confined by three sides of the touch screen surface TCS (e.g., the long side 13 and portions of the short sides 11 and 12 connected thereto) and is exposed to an outside. A remaining portion of the touch screen surface TCS, which is confined by three sides of the touch screen surface TCS (e.g., the long side 14 and remaining portions of the short sides 11 and 12) and will be referred to as a mounted portion MTP, may be inserted into the reception space RCS of the frame 100 and may not be exposed to the outside. The exposed portion EXP and the mounted portion MTP may be distinguished from each other, based on an imaginary line extending in the second direction DR2.

In a state where the display device DSP is coupled with the head-mounted device HMD, the active region AR may be divided into a first active region AR1 and a second active region AR2, which overlap the exposed portion EXP and the mounted portion MTP, respectively.

When the display device DSP is mounted in the head-mounted device HMD, an image display region DA may be defined in the second active region AR2. The image display region DA may be defined to have an area smaller than that of the second active region AR2. The image display region DA may include a left-eye image display region L_DA, on which a left-eye image is displayed, and a right-eye image display region R_DA, on which a right-eye image is displayed.

In an embodiment, the left-eye image display region L_DA and the right-eye image display region R_DA may be driven by separate driving parts. However, the invention is not limited thereto, and in an alternative embodiment, all of the left-eye image display region L_DA and the right-eye image display region R_DA may be driven by a single driving part.

Figure 9:
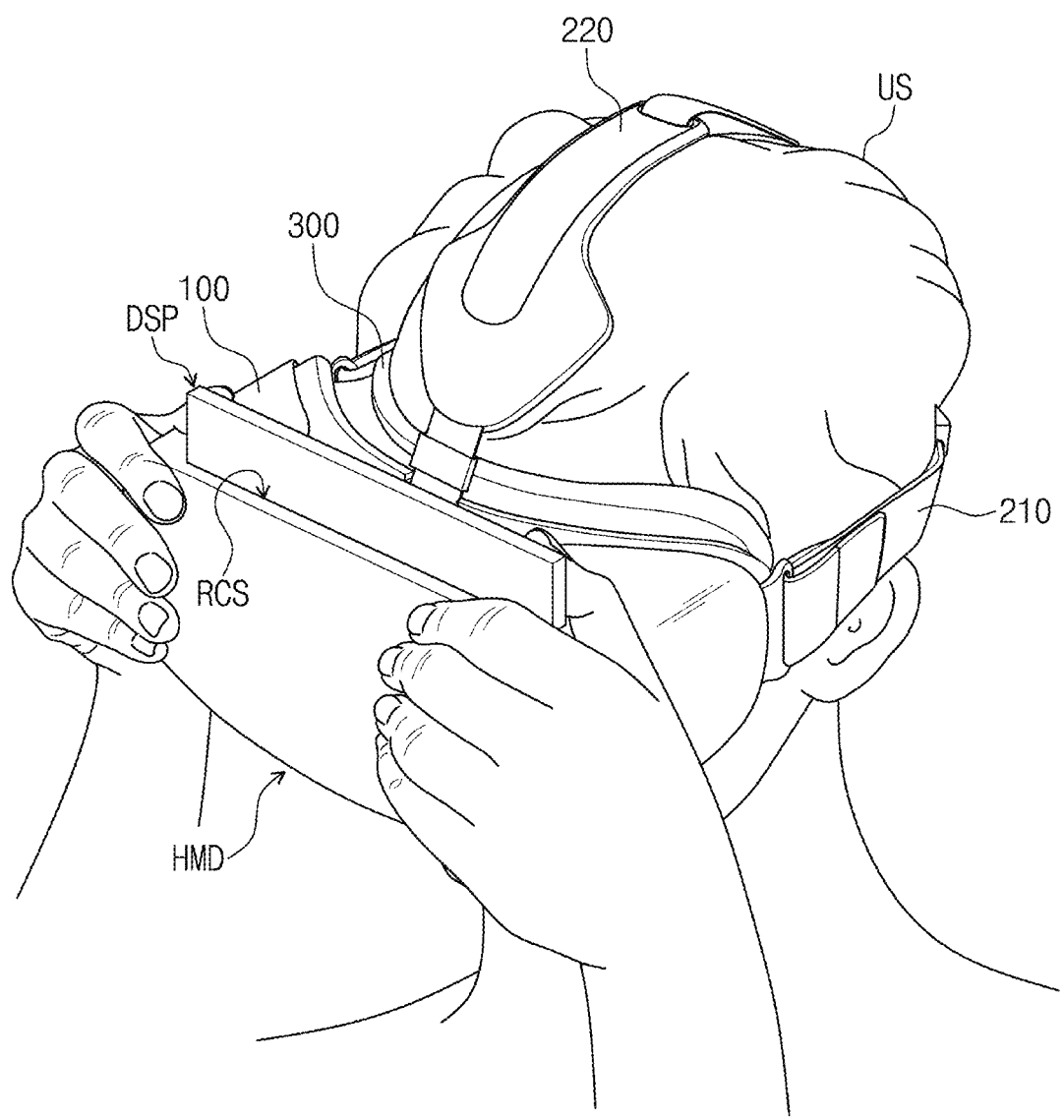
FIG. 9 is a diagram showing a combined structure of a head-mounted device and a display device in use, according to an embodiment of the invention.

FIG. 9 is a diagram showing a combined structure of a head-mounted device and a display device in use, according to an embodiment of the invention.

Referring to FIGS. 7 to 9, in an embodiment, the first active region AR1 may be used to receive a touch input from the user US to control the head-mounted device HMD.

In such an embodiment, the first active region AR1 may be configured to sense a touch input from the user. The display device DSP may transmit an input sensing signal corresponding to the sensed touch input to the head-mounted device HMD via wired and/or wireless communication. The head-mounted device HMD may be controlled based on the input sensing signal. In one embodiment, for example, a touch input, which is input through the first active region AR1, may be used to control various functions associated with control of volume of the head-mounted device HMD, focal length of the optical system OL (see FIG. 3), screen brightness, resolution, lens width, an image to be displayed on the display device DSP, and an assist device interlocked with the head-mounted device HMD, and search of graphic contents, for example.

However, the invention is not limited thereto, and in an alternative embodiment, the display device DSP may be directly controlled, based on the input sensing signal. Some functions, which may not use interlocked operation between the display device DSP and the head-mounted device HMD, may be directly controlled by the display device DSP, without wired and/or wireless communication with the head-mounted device HMD. In one embodiment, for example, the screen brightness of the display device DSP may be controlled, without signal exchange with the head-mounted device HMD, based on a touch input of a user US sensed by the first active region AR1.

In an embodiment, the first active region AR1, which functions as an input device for controlling the head-mounted device HMD, and the image display region DA, which displays an image on the user US, may be different regions and may not overlap each other.

In an embodiment of the head-mounted display system according to the invention, when the display device DSP is mounted in the head-mounted device HMD, the exposed first active region AR1 of the display device DSP may function as an input device for controlling the head-mounted device HMD. Accordingly, the head-mounted device HMD may effectively operate without using an additional input device, such that a weight and manufacturing cost of the head-mounted device HMD may be reduced and a degree of freedom in designing the head-mounted device HMD may be increased.

Operations of the display device DSP, which is coupled with the head-mounted device HMD, will be described in detail with reference to FIGS. 5, 6, and 8.

The user may not see the first active region AR1 through the head-mounted device HMD, even when the display device DSP and the head-mounted device HMD are combined with each other, and thus, an image may not be displayed on the first active region AR1. Accordingly, in such an embodiment, the display panel DP may not display an image on the first active region AR1, and the data signal Dm and/or the light-emitting control signal En may not be applied to the pixels PX in the first active region AR1.

Since the image display region DA is used to show an image to a user, the second active region AR2 including the image display region DA may also be used to display an image, when the display device DSP and the head-mounted device HMD are combined with each other. The pixels PX in the second active region AR2 may be driven in a normal manner.

According to an embodiment of the invention, the display device DSP may be configured not to display an image on the first active region AR1, such that power consumption of the display device DSP may be reduced. In such an embodiment, since the image is displayed on a portion of the touch screen surface TCS, such that a charging time for pixels corresponding to a single line is creased, while maintaining a frame time, and image quality of the display device DSP is thereby improved.

However, the invention is not limited thereto, and in an alternative embodiment, when the display device DSP and the head-mounted device HMD are combined with each other, both of the first active region AR1 and the second active region AR2 may be used to display an image. In one embodiment, for example, the second active region AR2 may be used to show an image to a user, and the first active region AR1 may be used to display a graphical user interface ("GUI") such as icons for guiding a user input.

When the display device DSP and the head-mounted device HMD are combined with each other, the first active region AR1 may be used to sense a user input. Accordingly, the input sensing unit TS may be activated at a region overlapping the first active region AR1. The input sensing unit TS may provide or receive the first touch signal to or from the first touch lines TX, which are arranged in the first active region AR1. The input sensing unit TS may provide or receive the second touch signal to or from the second touch lines RX, which are arranged in the first active region AR1.

When the display device DSP and the head-mounted device HMD are combined with each other, the second active region AR2 may not be exposed to the outside, and thus, the second active region AR2 may not be used to sense a user input. Thus, the input sensing unit TS may be inactivated at a region overlapping the second active region AR2. The input sensing unit TS may not provide or receive the first touch signal to or from the first touch lines TX, which are arranged in the second active region AR2. The input sensing unit TS may not provide or receive the second touch signal to or from the second touch lines RX, which are arranged in the second active region AR2.

The above-described operations of the display device DSP in the first active region AR1 and the second active region AR2 may be substantially the same as those of the display device in other embodiments to be described with reference to FIGS. 10A to 26.

According to an embodiment of the invention, since the display device DSP does not sense a user input on the second active region AR2, power consumption in the display device DSP may be substantially reduced.

Figure 10A:
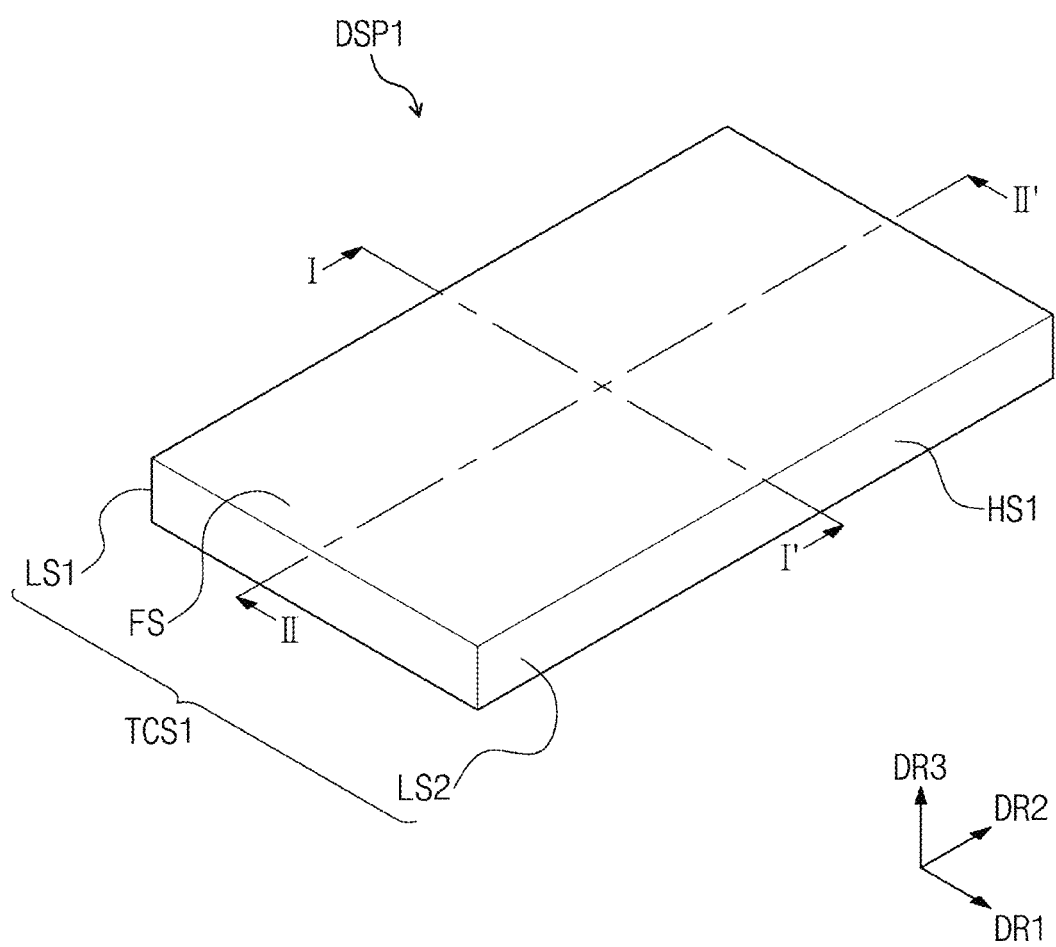
FIG. 10A is a perspective view illustrating a display device according to an alternative embodiment of the invention.
Figure 10B:
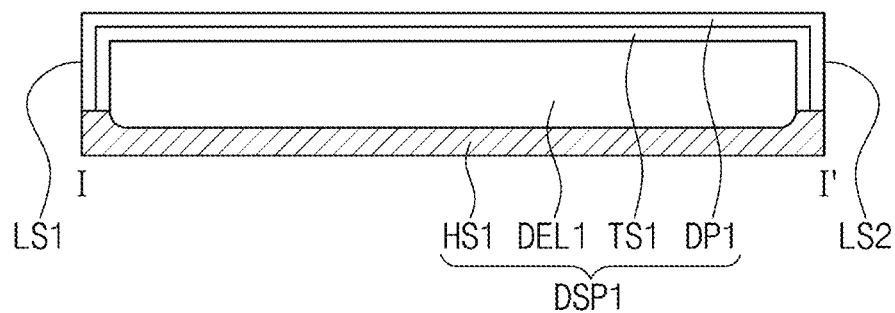
FIG. 10B is a cross-sectional view taken along line I-I' of FIG. 10A.
Figure 10C:
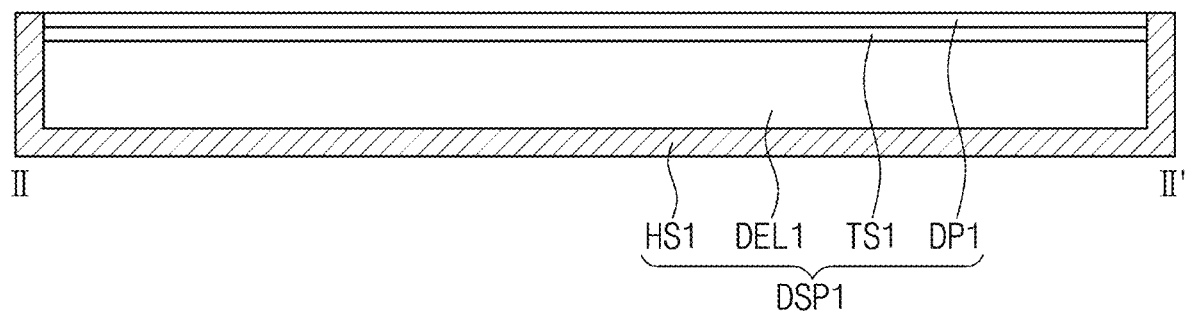
FIG. 10C is a cross-sectional view taken along line II-IF of FIG. 10A.
Figure 11:
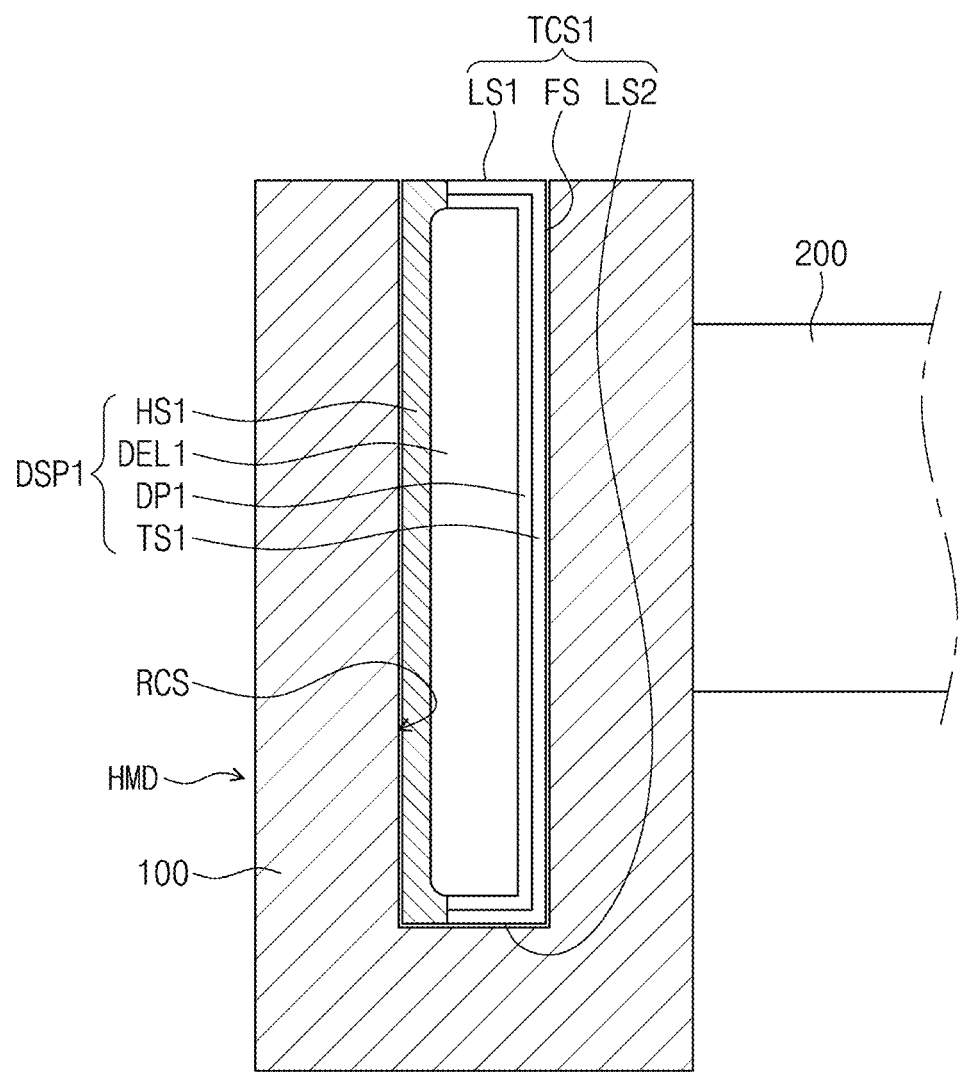
FIG. 11 is a cross-sectional side view illustrating the display device of FIGS. 10A to 10C combined with a head-mounted device.

FIG. 10A is a perspective view illustrating a display device according to an alternative embodiment of the invention, FIG. 10B is a cross-sectional view taken along line I-I' of FIG. 10A, and FIG. 10C is a cross-sectional view taken along line II-II' of FIG. 10A. FIG. 11 is a cross-sectional side view illustrating the display device of FIGS. 10A to 10C combined with a head-mounted device.

Referring to FIGS. 10A to 10C and 11, an embodiment of a display device DSP1 may include a display panel DP1, an input sensing unit TS1, a driving device structure DELL and a housing HS1. The display panel DP1, the input sensing unit TS1, the driving device structure DELL and the housing HS1 of the display device DSP1 may be substantially the same as those of corresponding components of the display device DSP described with reference to FIG. 3, and any repetitive detailed description thereof will be omitted.

In such an embodiment, a touch screen surface TCS1 of the display device DSP1 may have a bent shape.

The touch screen surface TCS1 may include a front surface FS, a first side surface LS1, and a second side surface LS2. The front surface FS, the first side surface LS1, and the second side surface LS2 may be distinguished from each other, based on an imaginary line parallel to the second direction DR2. In the first direction DR1, the front surface FS may be between the first side surface LS1 and the second side surface LS2. The first side surface LS1 may be bent from an end of the front surface FS in the first direction DR1, and the second side surface LS2 may be bent from an opposite end of the front surface FS in the first direction DR1.

Each of the front surface FS, the first side surface LS1, and the second side surface LS2 may be flat. The front surface FS and the first side surface LS1 may meet to form a right angle or an obtuse angle. The front surface FS and the second side surface LS2 may meet to form a right angle or an obtuse angle.

In an embodiment, when the display device DSP1 is mounted in the head-mounted device HMD, at least one of the first side surface LS1 and the second side surface LS2 may be exposed to the outside through the reception space RCS. FIG. 11 illustrates an embodiment in which the first side surface LS1 is exposed to the outside.

FIG. 11 illustrates an embodiment in which the entire portion of the display device DSP1 is inserted into the reception space RCS and the front surface FS of the touch screen surface TCS1 is not exposed to the outside, but the invention is not limited thereto. In an alternative embodiment, a portion of the display device DSP1 may protrude outwardly from the head-mounted device HMD and a portion of the front surface FS of the touch screen surface TCS1 may be exposed to the outside.

Figure 12:
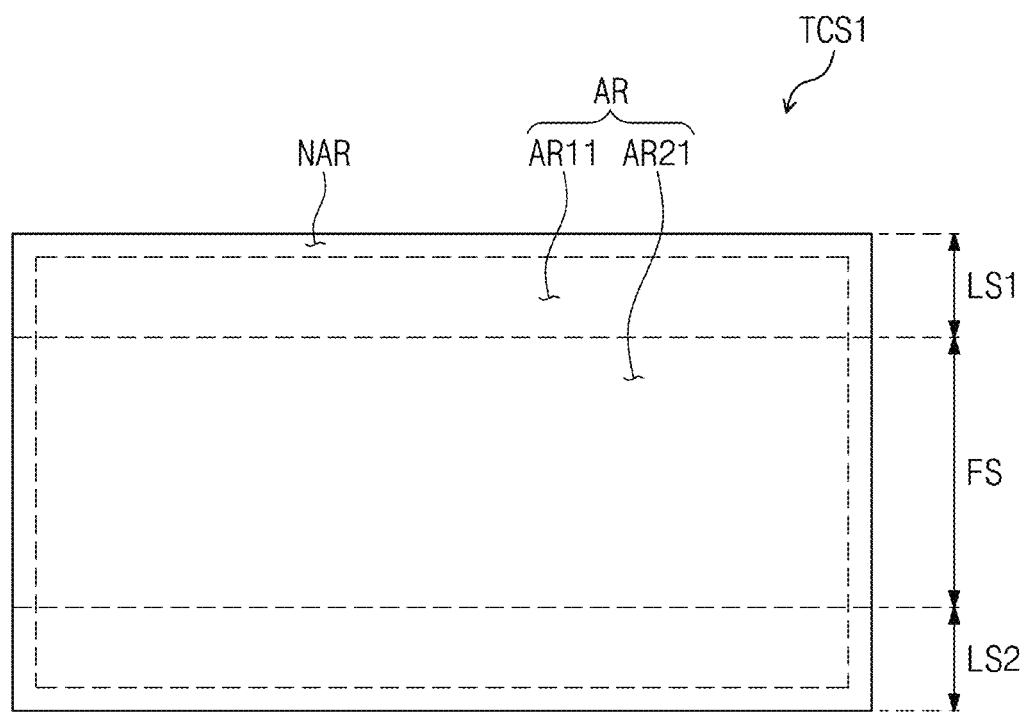
FIG. 12 is a plan view illustrating a projection image of a touch screen surface of a display device.
Figure 12:
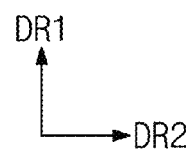
Figure 13:
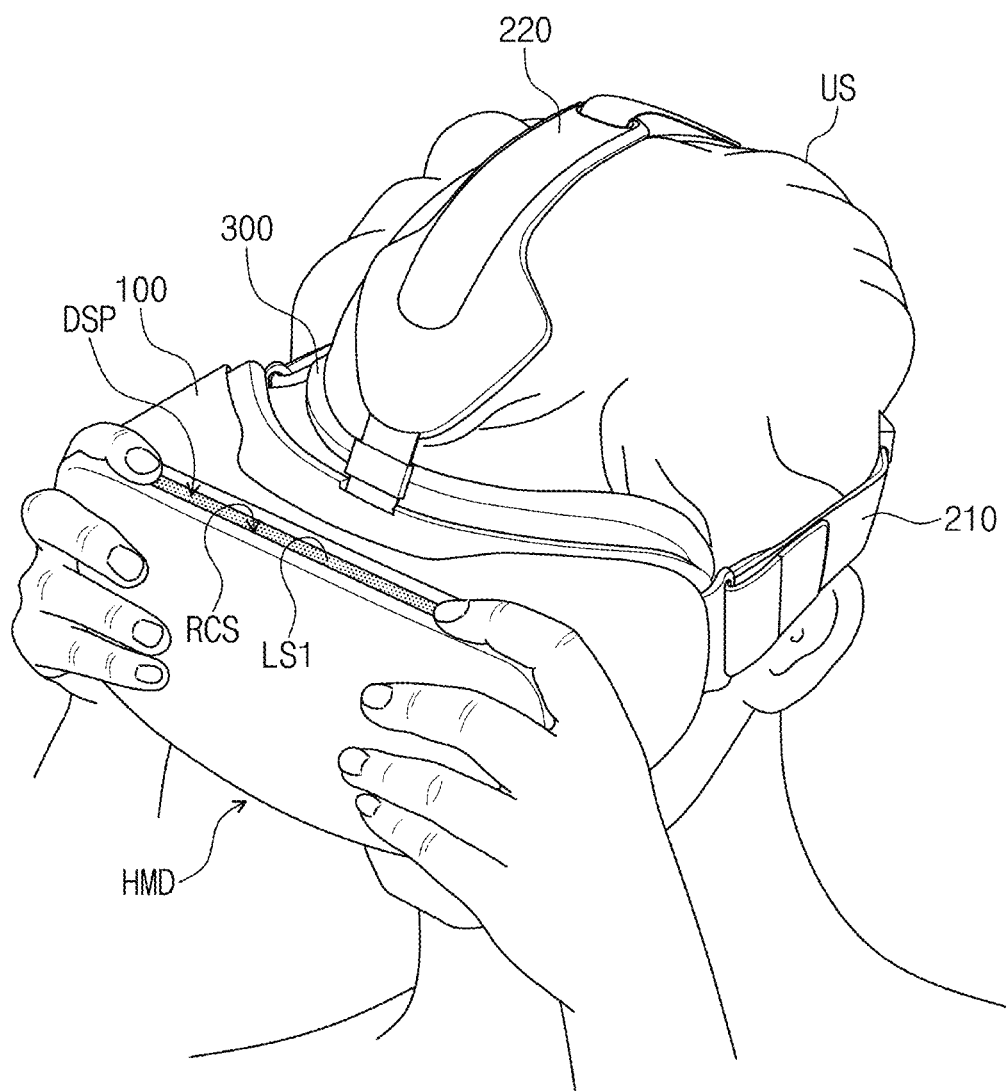
FIG. 13 is a diagram showing a combined structure of the head-mounted device and the display device shown in FIG. 11 in use.

FIG. 12 is a plan view illustrating a projection image of a touch screen surface of a display device, and FIG. 13 is a diagram showing a combined structure of the head-mounted device and the display device shown in FIG. 11 in use.

Since the first side surface LS1 is exposed to the outside, the active region AR may be divided into a first active region AR11, which overlaps the first side surface LS1, and a second active region AR21, which overlaps the front surface FS and the second side surface LS2, when the display device DSP1 is coupled to the head-mounted device HMD.

The first active region AR11 (e.g., a portion of the first side surface LS1) may be used to receive a touch input from the user US to control the head-mounted device HMD. Since a control target has been described with reference to FIG. 9, and thus, any repetitive detailed description thereof will be omitted.

In an embodiment of the head-mounted display system according to the invention, a portion of the side surface of the touch screen surface TCS1 may be used as an input device for controlling the head-mounted device HMD. Accordingly, the head-mounted device HMD may effectively operate without using an additional input device, and thus a weight and manufacturing cost of the head-mounted device HMD may be reduced and a degree of freedom in designing the head-mounted device HMD may be increased.

Figure 14:
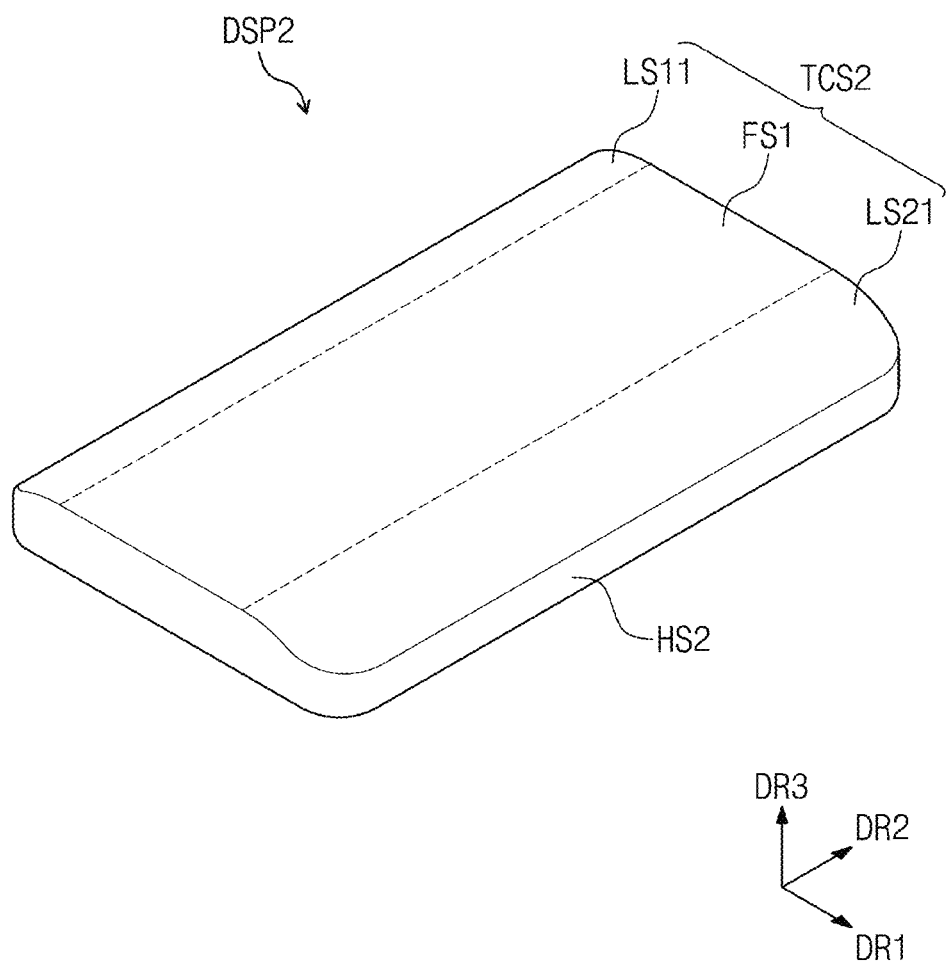
FIG. 14 is a perspective view illustrating a display device according to another alternative embodiment of the invention.
Figure 15:
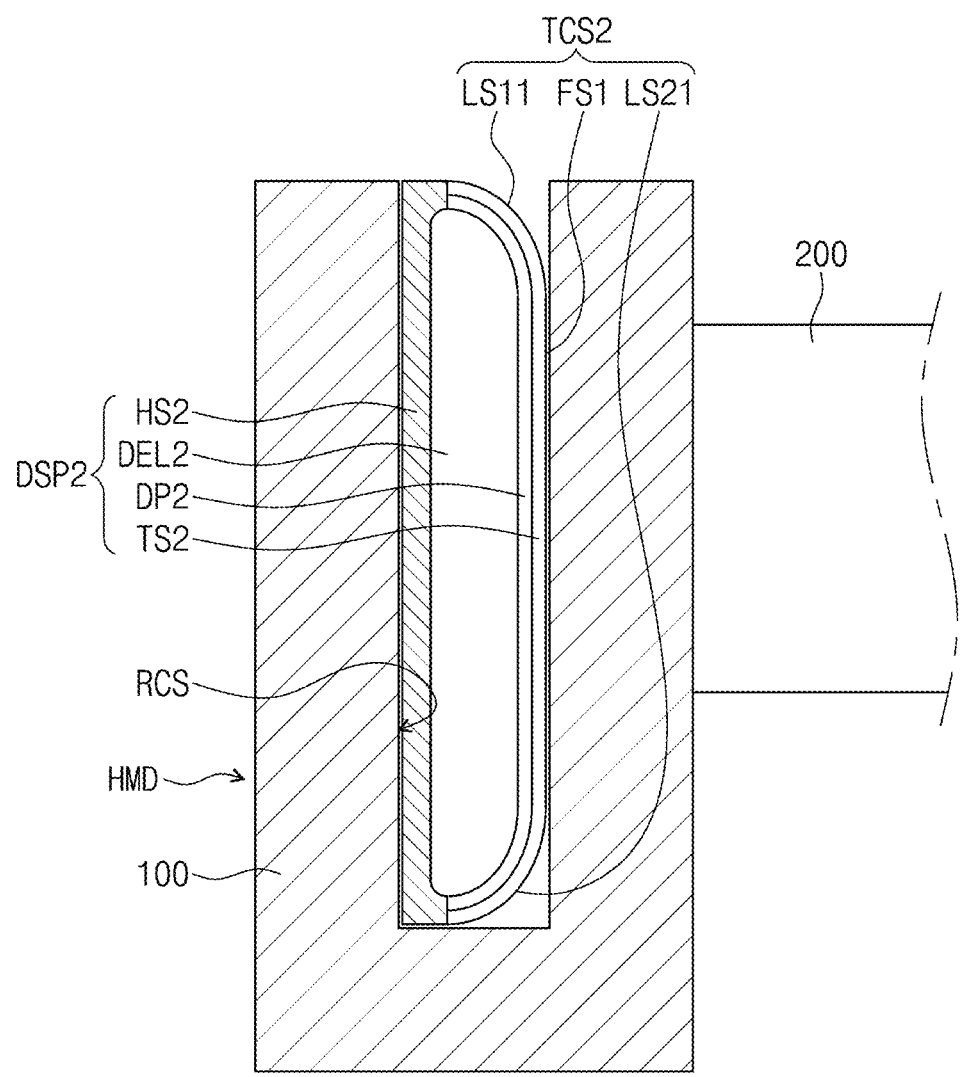
FIG. 15 is a cross-sectional side view illustrating the display device of FIG. 14 combined with a head-mounted device.

FIG. 14 is a perspective view illustrating a display device according to another alternative embodiment of the invention, and FIG. 15 is a cross-sectional side view illustrating the display device of FIG. 14 combined with a head-mounted device.

A display device DSP2 of FIG. 14 may be substantially the same as the display device DSP1 of FIGS. 10A to 10C, except that a first side surface LS11 and a second side surface LS21 of the display device DSP2 are curved surfaces, not flat surfaces.

Referring to FIGS. 14 and 15, an embodiment of the display device DSP2 may include a display panel DP2, an input sensing unit TS2, a driving device structure DEL2, and a housing HS2. The display panel DP2, the input sensing unit TS2, the driving device structure DEL2, and the housing HS2 may be configured to have substantially the same features as those of corresponding components of the display device DSP described above with reference to FIG. 3, and any repetitive detailed description thereof will be omitted.

A touch screen surface TCS2 may include a front surface FS1, a first side surface LS11, and a second side surface LS21. The front surface FS1, the first side surface LS11, and the second side surface LS21 may be distinguished from each other, based on an imaginary line parallel to the second direction DR2. In the first direction DR1, the front surface FS1 may be placed between the first side surface LS11 and the second side surface LS21.

The front surface FS1 may be flat. Each of the first side surface LS11 and the second side surface LS21 may have a curved shape. When the display device DSP2 is mounted in the head-mounted device HMD, at least one of the first side surface LS11 and the second side surface LS21 may be exposed to the outside through the reception space RCS. FIG. 15 shows an embodiment in which the first side surface LS11 is exposed to the outside.

As shown in FIGS. 12 and 13, the exposed portion of the first side surface LS11 (e.g., the first active region AR11) may be used to receive a touch input from the user US to control the head-mounted device HMD.

Figure 16:
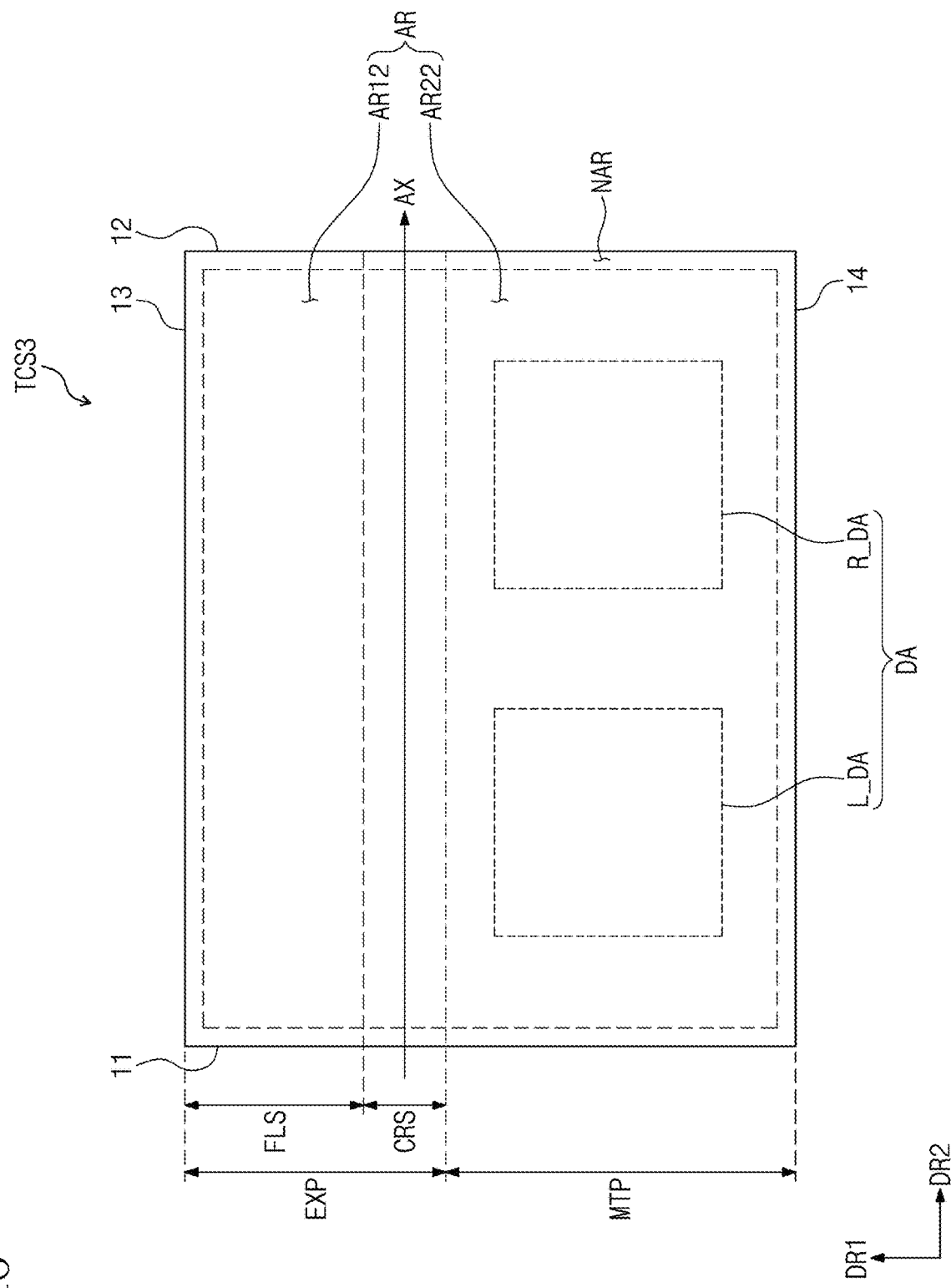
FIG. 16 is a plan view illustrating a projection image of a touch screen surface of a display device according to another alternative embodiment of the invention.
Figure 17:
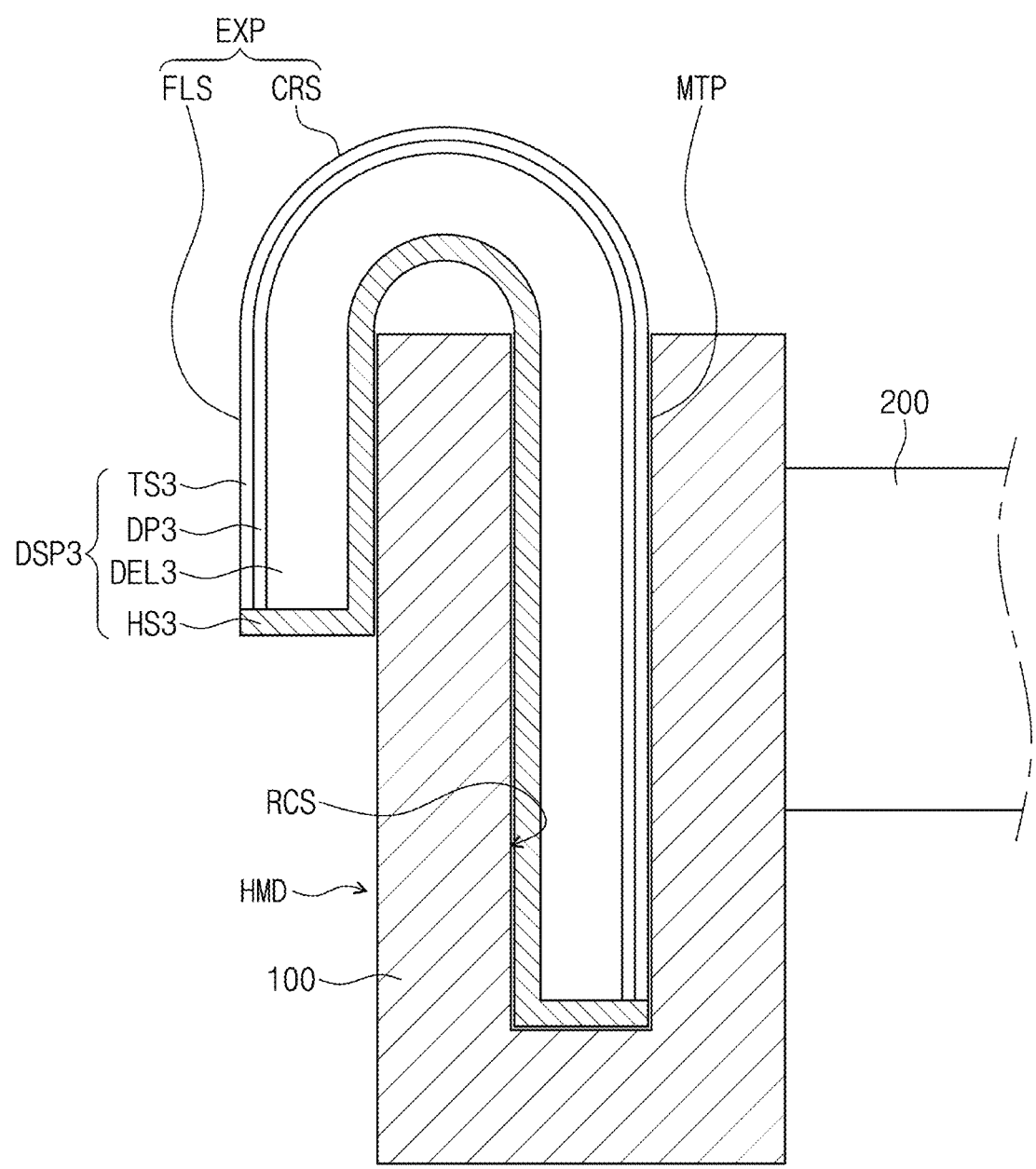
FIG. 17 is a cross-sectional side view illustrating the display device of FIG. 16 combined with a head-mounted device.

FIG. 16 is a plan view illustrating a projection image of a touch screen surface of a display device according to another alternative embodiment of the invention, and FIG. 17 is a cross-sectional side view illustrating the display device of FIG. 16 combined with a head-mounted device.

In an embodiment, a display device DSP3 may include a display panel DP3, an input sensing unit TS3, a driving device structure DEL3, and a housing HS3. In such an embodiment, the display panel DP3, the input sensing unit TS3, the driving device structure DEL3 and the housing HS3 may be substantially the same as those of the display device DSP described with reference to FIG. 3, and any repetitive detailed description thereof will be omitted.

The display device DSP3 may be folded or foldable with respect to a reference axis AX parallel to the second direction DR2. The display panel DP3 may be an organic light emitting display panel, and the housing HS3 may have a hinge structure for folding the display device DSP3 or may include or be formed of a flexible material.

In such an embodiment, as shown in FIG. 17, when the display device DSP3 is coupled with the head-mounted device HMD, a touch screen surface TCS3 may include an exposed portion EXP, which is confined by three sides of the touch screen surface TCS3 (e.g., the long side 13 and portions of the short sides 11 and 12 connected thereto) and is exposed to the outside. A mounted portion MTP of the touch screen surface TCS3, which is confined by three sides of the touch screen surface TCS3 (e.g., the long side 14 and remaining portions of the short sides 11 and 12), may be inserted into the reception space RCS of the frame 100 and may not be exposed to the outside. The exposed portion EXP may extend from an end of the long side of the mounted portion MTP. The exposed portion EXP may be divided into a flat surface FLS and a curved surface CRS. The curved surface CRS may be positioned between the flat surface FLS and the mounted portion MTP, in the first direction DR1.

In the case where the display device DSP3 in a folded state is coupled with the head-mounted device HMD, the flat surface FLS and the mounted portion MTP may face each other with the cover portion 100_2 interposed therebetween.

In the case where the display device DSP3 in the folded state is coupled with the head-mounted device HMD, the active region AR may be divided into a first active region AR12, which overlaps the exposed portion EXP, and a second active region AR22, which overlaps the mounted portion MTP.

Figure 18:
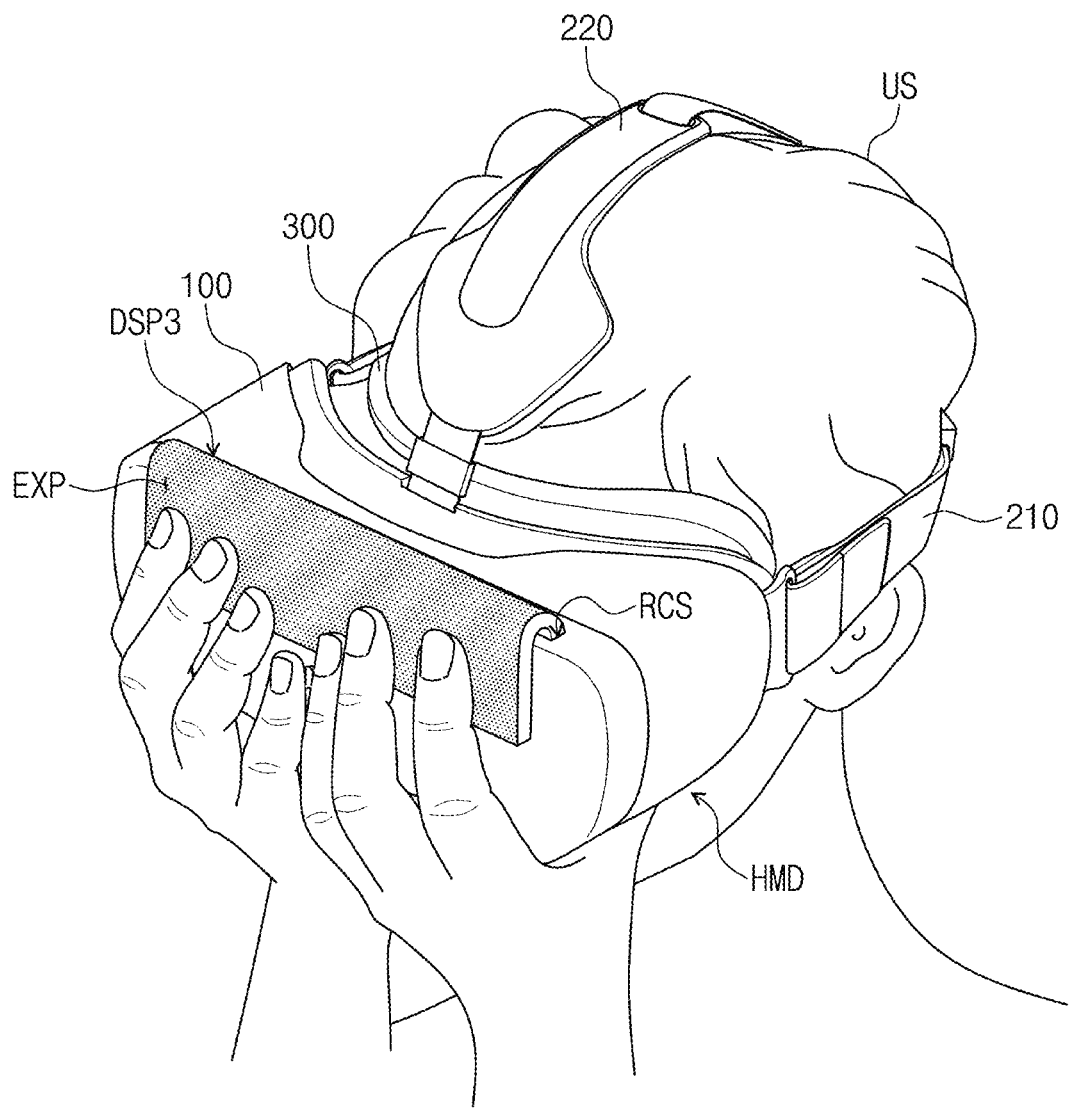
FIG. 18 is a diagram showing a combined structure of the head-mounted device and the display device shown in FIG. 17 in use.

FIG. 18 is a diagram showing a combined structure of the head-mounted device and the display device shown in FIG. 17 in use.

Referring to FIGS. 16 and 18, the first active region AR12 (i.e., a portion of the exposed portion EXP) may be used to receive a touch input from the user US to control the head-mounted device HMD.

In an embodiment of the head-mounted display system according to the invention, the user may have a palm facing the user US, when a touch input from the user is provided to a portion of the touch screen surface TCS3, and thus, to the user may control the head-mounted device HMD with improved convenience. In such an embodiment, the head-mounted device HMD may operate without an additional input device, and a weight and fabrication cost of the head-mounted device HMD may be reduced and a degree of freedom in designing the head-mounted device HMD may be increased.

Figure 19:
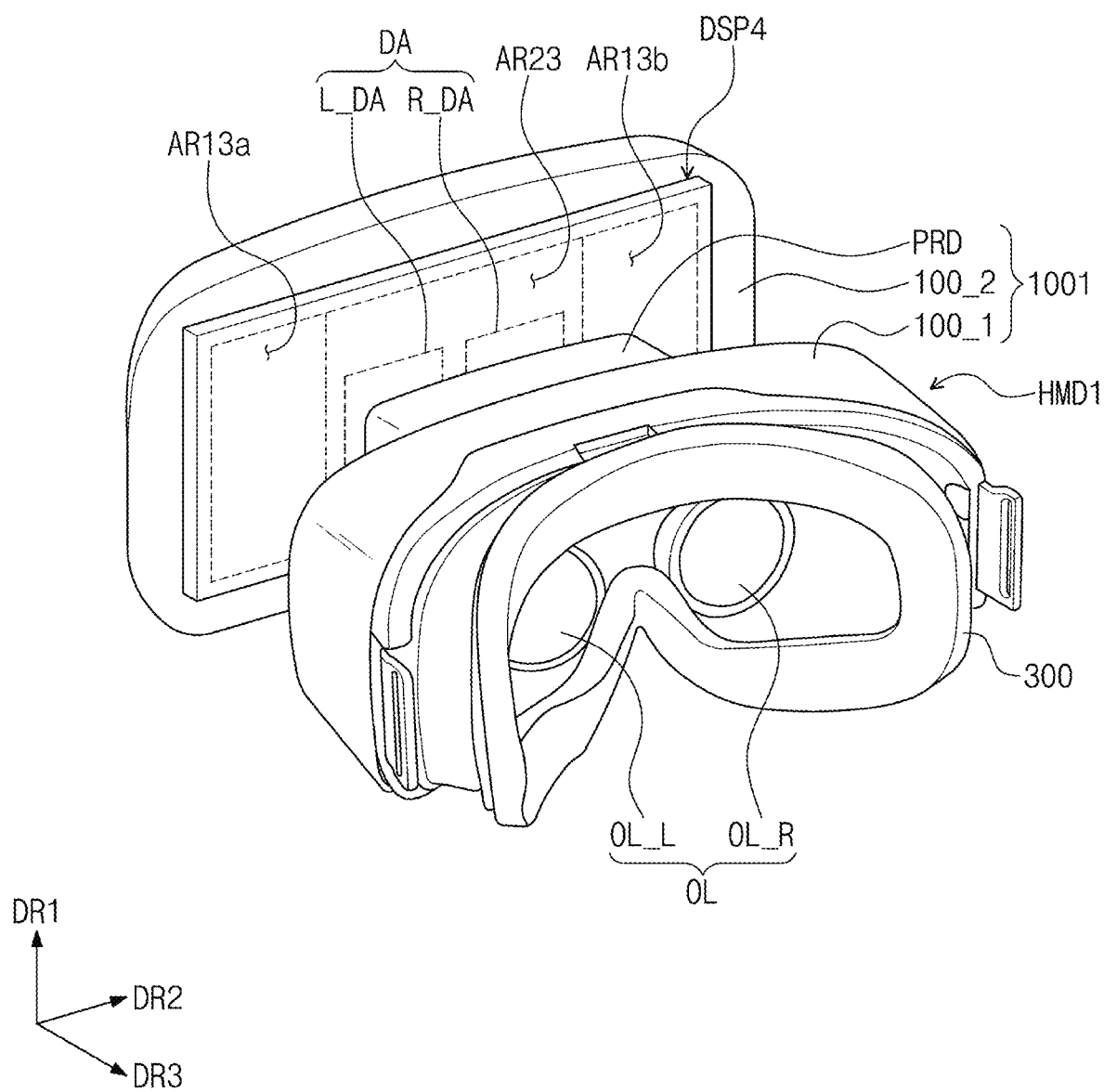
FIG. 19 is an exploded perspective view illustrating a partially-exploded structure of a display device and a head-mounted device, according to another alternative embodiment of the invention.
Figure 20:
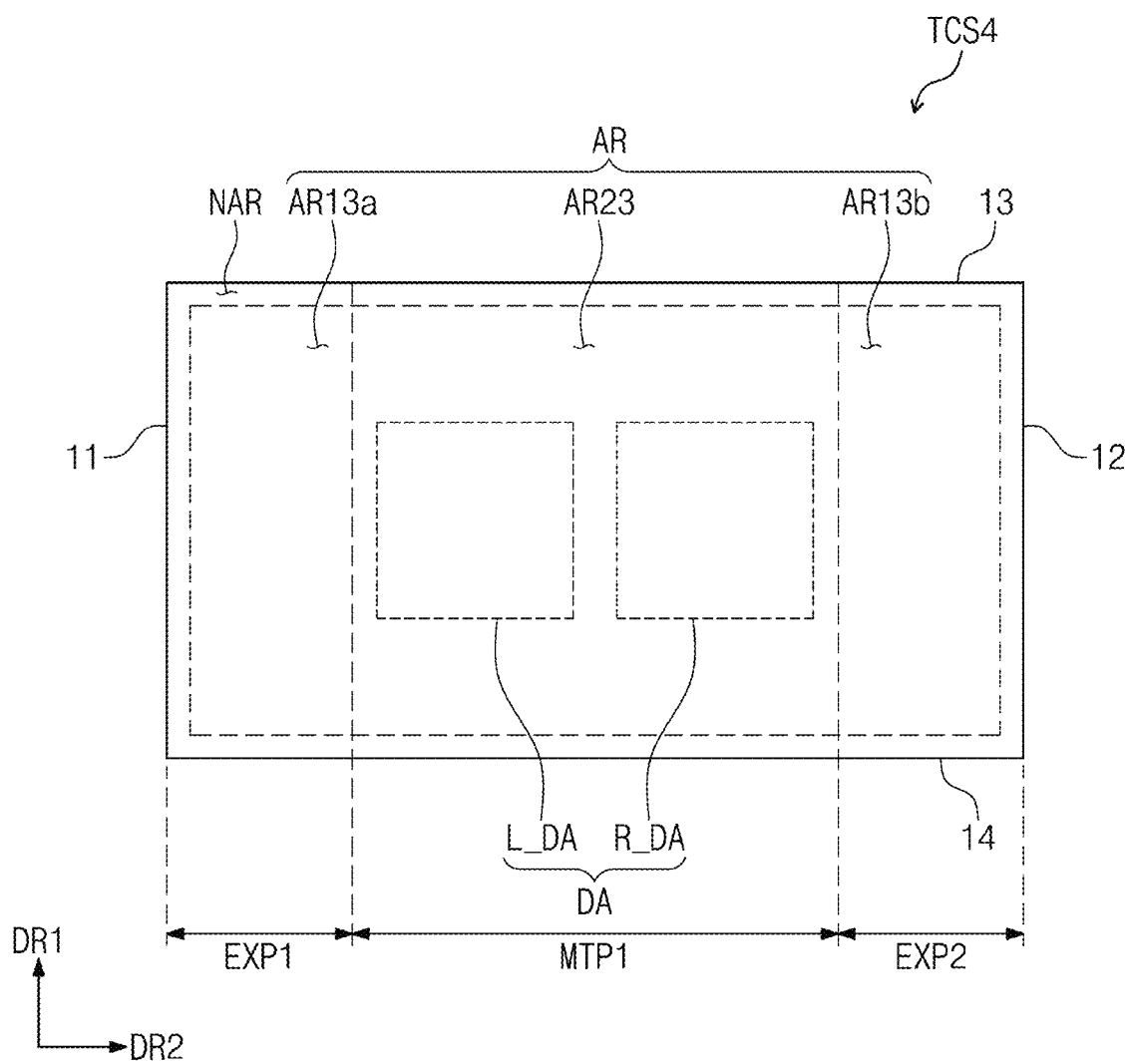
FIG. 20 is a plan view illustrating a display device.

FIG. 19 is an exploded perspective view illustrating a partially-exploded structure of a display device and a head-mounted device, according to another alternative embodiment of the invention, and FIG. 20 is a plan view illustrating a display device.

In an embodiment, as shown in FIG. 19, a frame 1001 of a head-mounted device HMD1 may further include a protruding portion PRD. The protruding portion PRD may be protruded from the main frame 100_1 and may be disposed between a display device DSP4 and the main frame 100_1.

The protruding portion PRD may have a hollow tube-like shape. The protruding portion PRD may be configured to provide an image, which is provided from a region of the display device DSP4, to a user through the optical system OL. The protruding portion PRD may be shorter than the display device DSP4, when measured in the second direction DR2.

Referring to FIG. 19, a touch screen surface TCS4 may be flat, and the protruding portion PRD may be provided to expose a portion of an edge of the touch screen surface TCS4 of the display device DSP4 in the second direction DR2.

In such an embodiment, when the display device DSP4 is coupled with the head-mounted device HMD1, the touch screen surface TCS4 may include a first exposed portion EXP1, which is confined by three sides of the touch screen surface TCS4 (e.g., the short side 11 and portions of the long sides 13 and 14 connected thereto) and is exposed to the outside. In such an embodiment, the touch screen surface TCS4 may include a second exposed portion EXP2, which is confined by three sides of the touch screen surface TCS4 (e.g., the short side 12 and portions of the long sides 13 and 14 connected thereto) and is exposed to the outside. The touch screen surface TCS4 may include a mounted portion MTP1, which is defined between the first and second exposed portions EXP1 and EXP2 and is confined by portions of the long sides 13 and 14 of the touch screen surface TCS4, and the mounted portion MTP1 may be covered with the protruding portion PRD and may not be exposed to the outside. The first exposed portion EXP1, the second exposed portion EXP2, and the mounted portion MTP1 may be roughly divided, based on an imaginary line extending in the first direction DR1.

In the case where the display device DSP4 is coupled with the head-mounted device HMD1, the active region AR may be divided into first active regions AR13a and AR13b, which are respectively overlapping the first and second exposed portions EXP1 and EXP2, and a second active region AR23, which overlaps the mounted portion MTP1.

Figure 21:
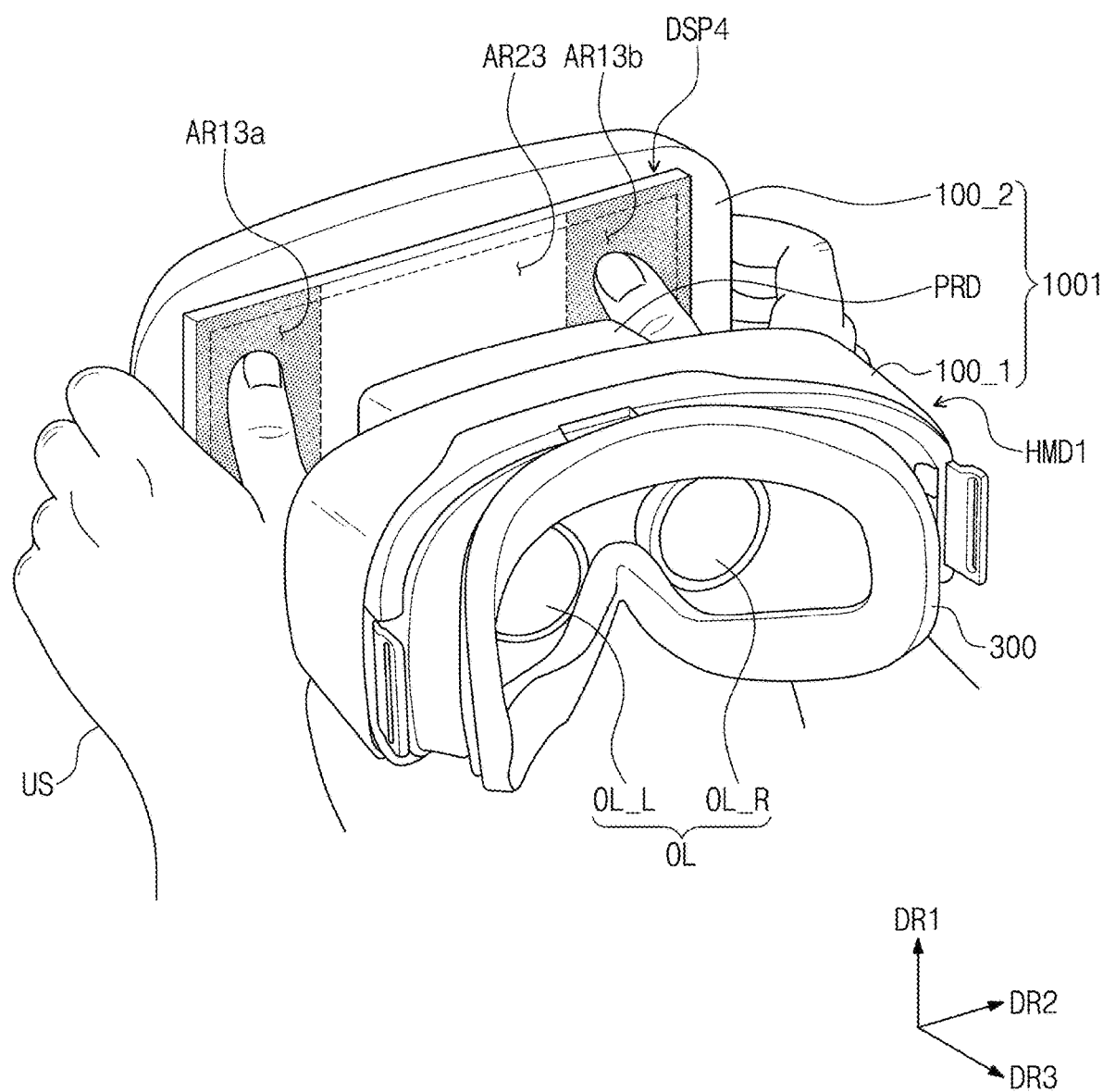
FIG. 21 is a diagram showing a combined structure of the head-mounted device and the display device shown in FIG. 19 in use.

FIG. 21 is a diagram showing a combined structure of the head-mounted device and the display device shown in FIG. 19 in use.

In an embodiment, the first active regions AR13a and AR13b (i.e., portions of side region of the touch screen surface TCS4 of the display device DSP4 in the second direction DR2) may be used to receive a touch input from the user US to control the head-mounted device HMD1.

Figure 22A:
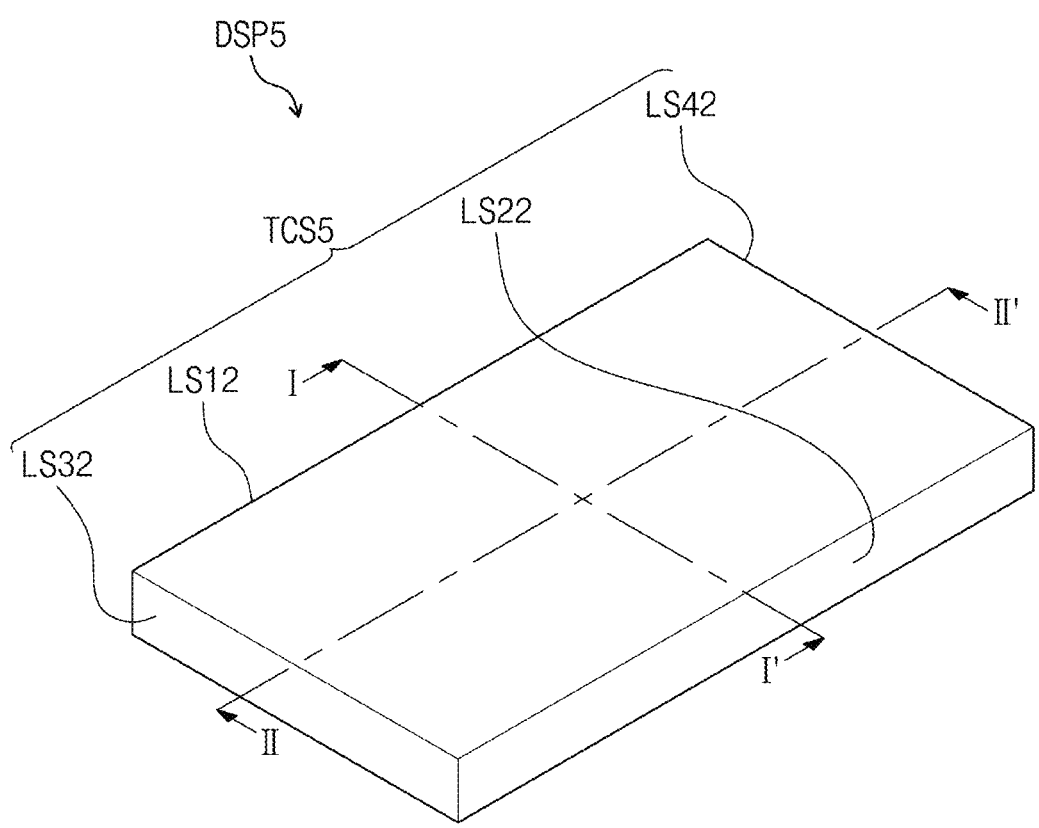
FIG. 22A is a perspective view illustrating a display device according to other embodiments of the invention.
Figure 22A:
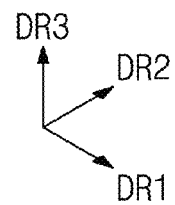
Figure 22B:
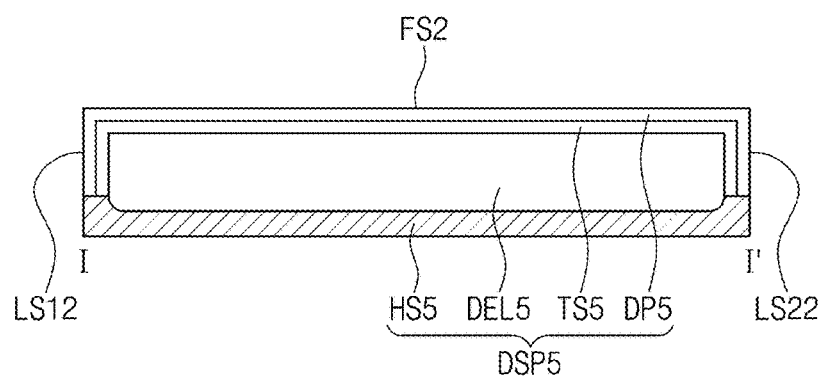
FIG. 22B is a cross-sectional view taken along line I-I' of FIG. 22A.
Figure 22C:
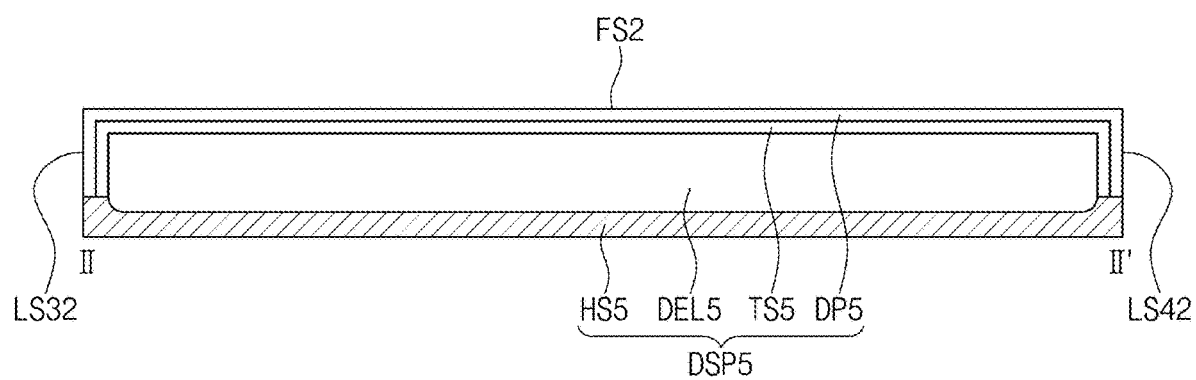
FIG. 22C is a cross-sectional view taken along line II-IF of FIG. 22A.
Figure 23:
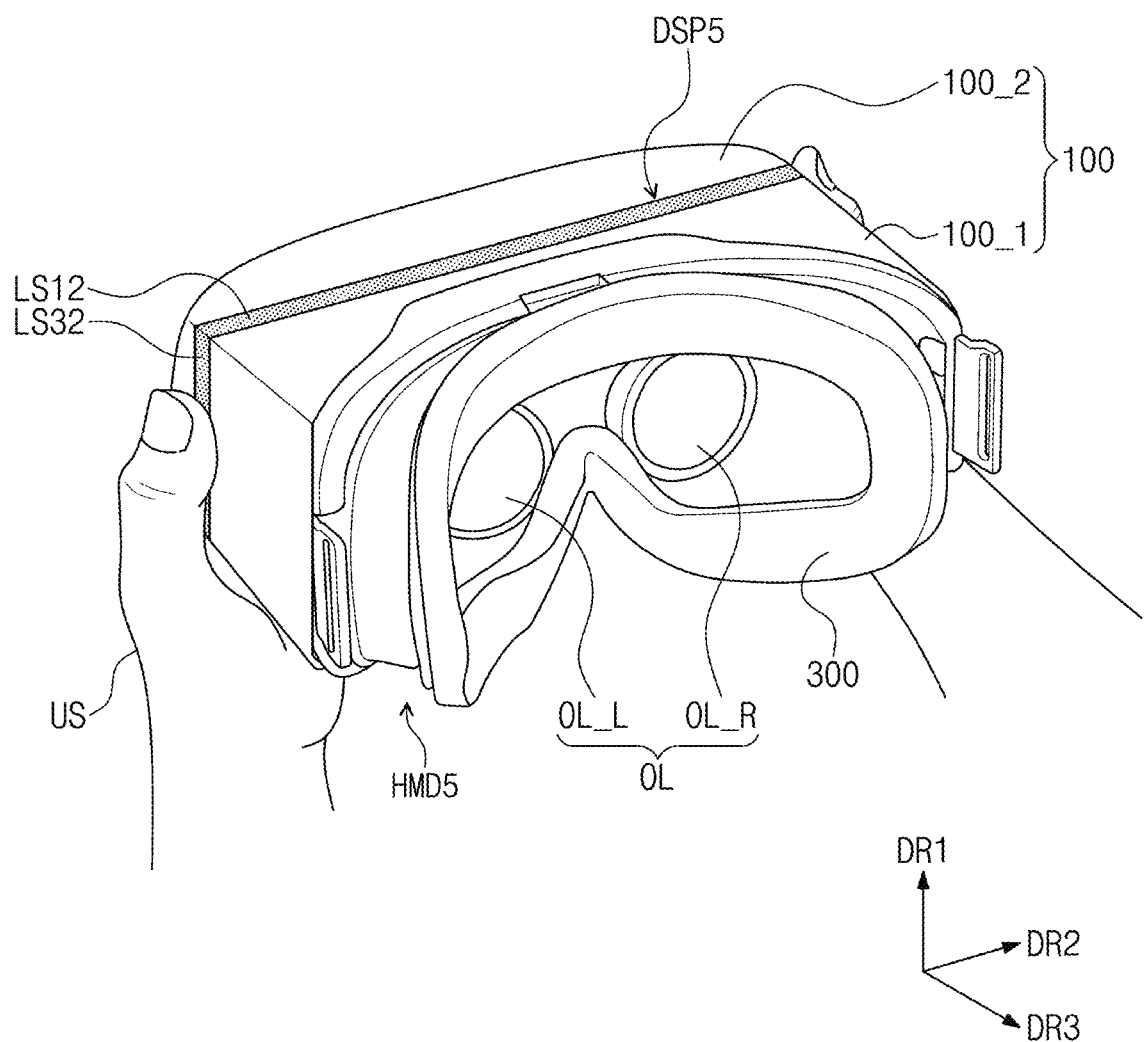
FIG. 23 is a perspective view illustrating a combined structure of the display device of FIGS. 22A to 22C and a head-mounted device.

FIG. 22A is a perspective view illustrating a display device according to another alternative embodiment of the invention, FIG. 22B is a cross-sectional view taken along line I-I' of FIG. 22A, and FIG. 22C is a cross-sectional view taken along line II-II' of FIG. 22A. FIG. 23 is a perspective view illustrating a combined structure of the display device of FIGS. 22A to 22C and a head-mounted device.

A display device DSP5, which will be described with reference to FIGS. 22A to 22C, may differ from the display device DSP1 described with reference to FIG. 10 in terms of the number of the side surfaces displaying an image. In such an embodiment, as shown in FIGS. 10A to 10C, the display device DSP1 of may be configured to display an image through the front surface FS and two side surfaces LS1 and LS2, and the display device DSP5 of FIGS. 22A to 22C may be configured to display an image through a front surface FS2 and first to fourth side surfaces LS12 to LS42.

In such an embodiment, the display device DSP5 may include a display panel DP5, an input sensing unit TS5, a driving device structure DEL5, and a housing HS5. The display panel DP5, the input sensing unit TS5, the driving device structure DEL5, and the housing HS5 may be substantially the same as those of the display device DSP described with reference to FIG. 3, and any repetitive detailed description thereof will be omitted.

A touch screen surface TCS5 may include the front surface FS2 and the first to fourth side surfaces LS12 to LS42. The first to fourth side surfaces LS12 to LS42 may be connected to four sides of the front surface FS2. The first and second side surfaces LS12 to LS22 may extend from two long sides of the front surface FS2. The third and fourth side surfaces LS32 to LS42 may extend from two short sides of the front surface FS2. The first side surface LS12 and second side surface LS22 may face each other in the first direction DR1. The third side surface LS32 and the fourth side surface LS42 may face each other in the second direction DR2.

Each of the front surface FS2 and the first to fourth side surfaces LS12 to LS42 may be flat. The front surface FS2 and the first to fourth side surfaces LS12 to LS42 may meet to form a right angle or an obtuse angle. However, the invention is not limited thereto, and in an alternative embodiment, the first to fourth side surfaces LS12 to LS42 may extend from the front surface FS2 with a varying angle.

In an embodiment, when the display device DSP5 is mounted in a head-mounted device HMD2, at least one of the first to fourth side surfaces LS12 to LS42 may be exposed to the outside. In one embodiment, for example, the third and fourth side surfaces LS32 and LS42 connected to the short sides of the display device DSP5 may be exposed to the outside. FIG. 23 illustrates an embodiment in which all of the first to fourth side surfaces LS12 to LS42 are exposed to the outside.

FIG. 23 illustrates an embodiment in which the entire portion of the display device DSP5 is inserted into the frame 100 and the front surface FS2 of the touch screen surface TCS5 is not exposed to the outside, but the invention is not limited thereto. In an alternative embodiment, a portion of the display device DSP5 may protrude outwardly from the head-mounted device HMD2, and a portion of the front surface FS2 of the touch screen surface TCS5 may be exposed to the outside.

In such an embodiment, since the first to fourth side surfaces LS12 to LS42 are exposed to the outside, when the display device DSP5 is mounted in a head-mounted device HMD5, all or at least a portion of the first to fourth side surfaces LS12 to LS42 may be used to receive a touch input from the user US to control the head-mounted device HMD5. In one embodiment, for example, the third and fourth side surfaces LS32 and LS42 may be used to receive a touch input from a user US to control the head-mounted device HMD5.

In an embodiment of the head-mounted display system according to the invention, a portion of the side surface of the touch screen surface TCS5 may be used as an input device for controlling the head-mounted device HMD5. Accordingly, the head-mounted device HMD5 may effectively operate without an additional input device, and a weight and fabrication cost of the head-mounted device HMD5 may be reduced and a degree of freedom in designing the head-mounted device HMD5 may be increased.

Figure 24:
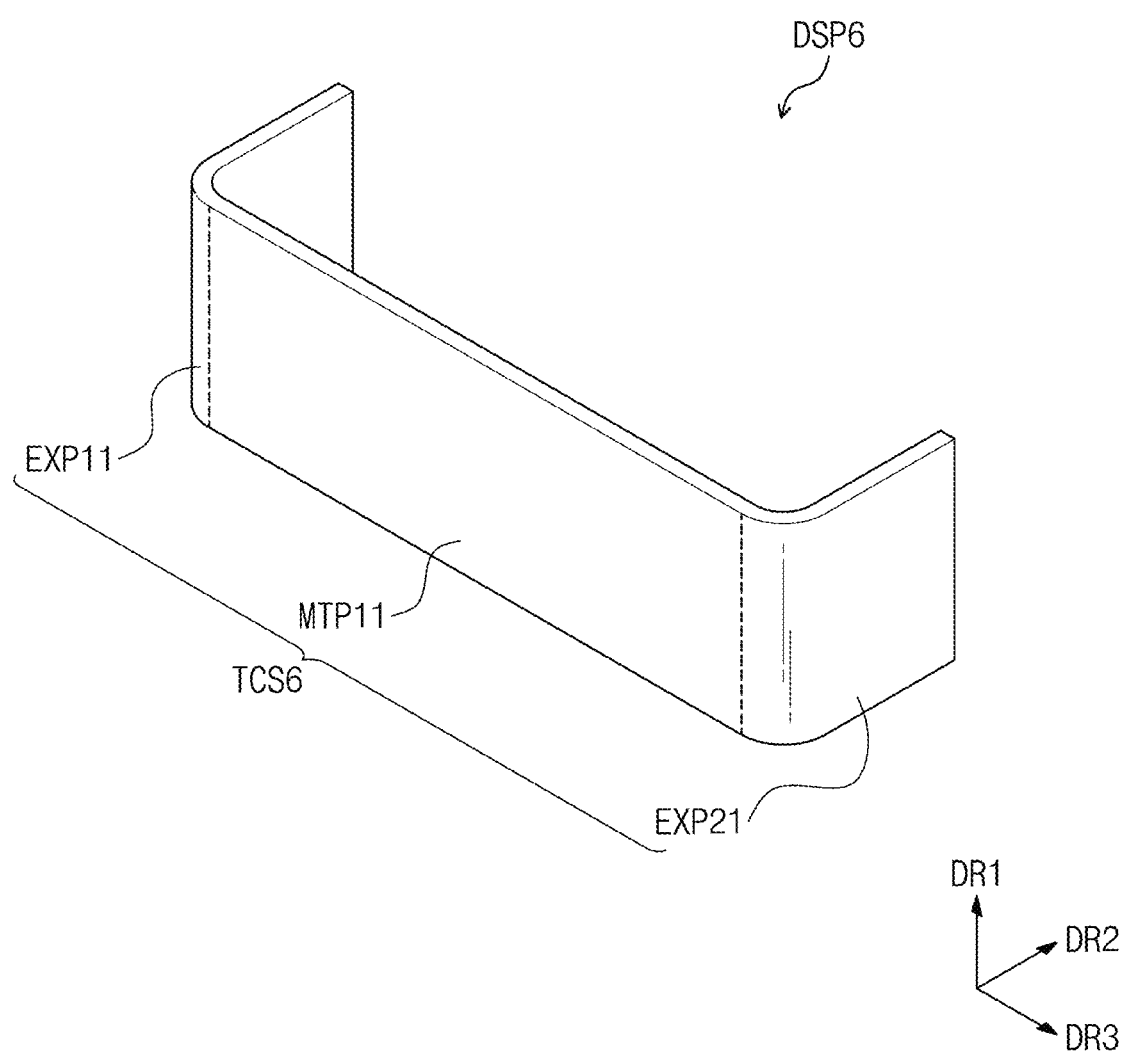
FIG. 24 is a perspective view illustrating a display device according to another alternative embodiment of the invention.
Figure 25:
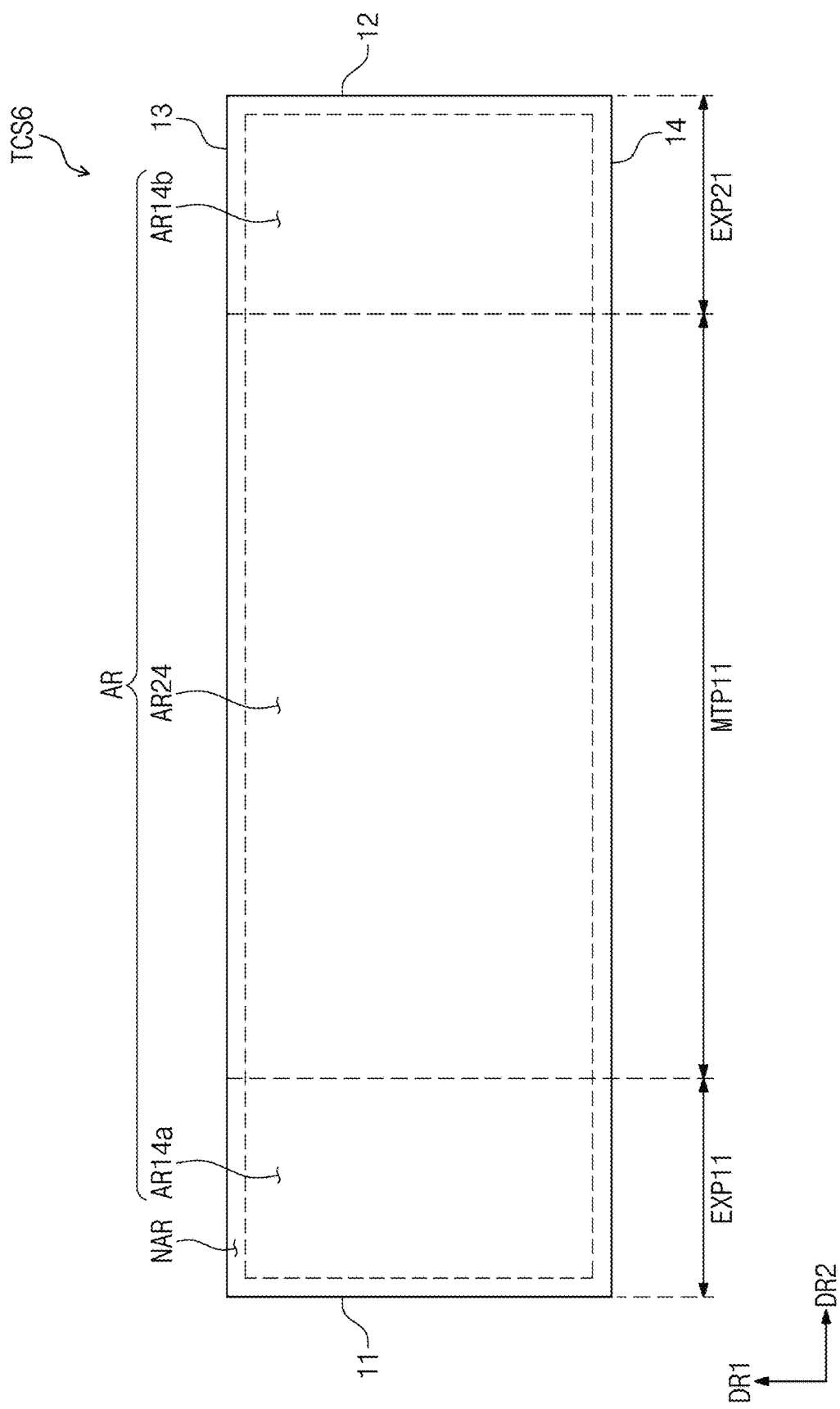
FIG. 25 is a plan view illustrating a projection image of a touch screen surface of the display device of FIG. 24.
Figure 26:
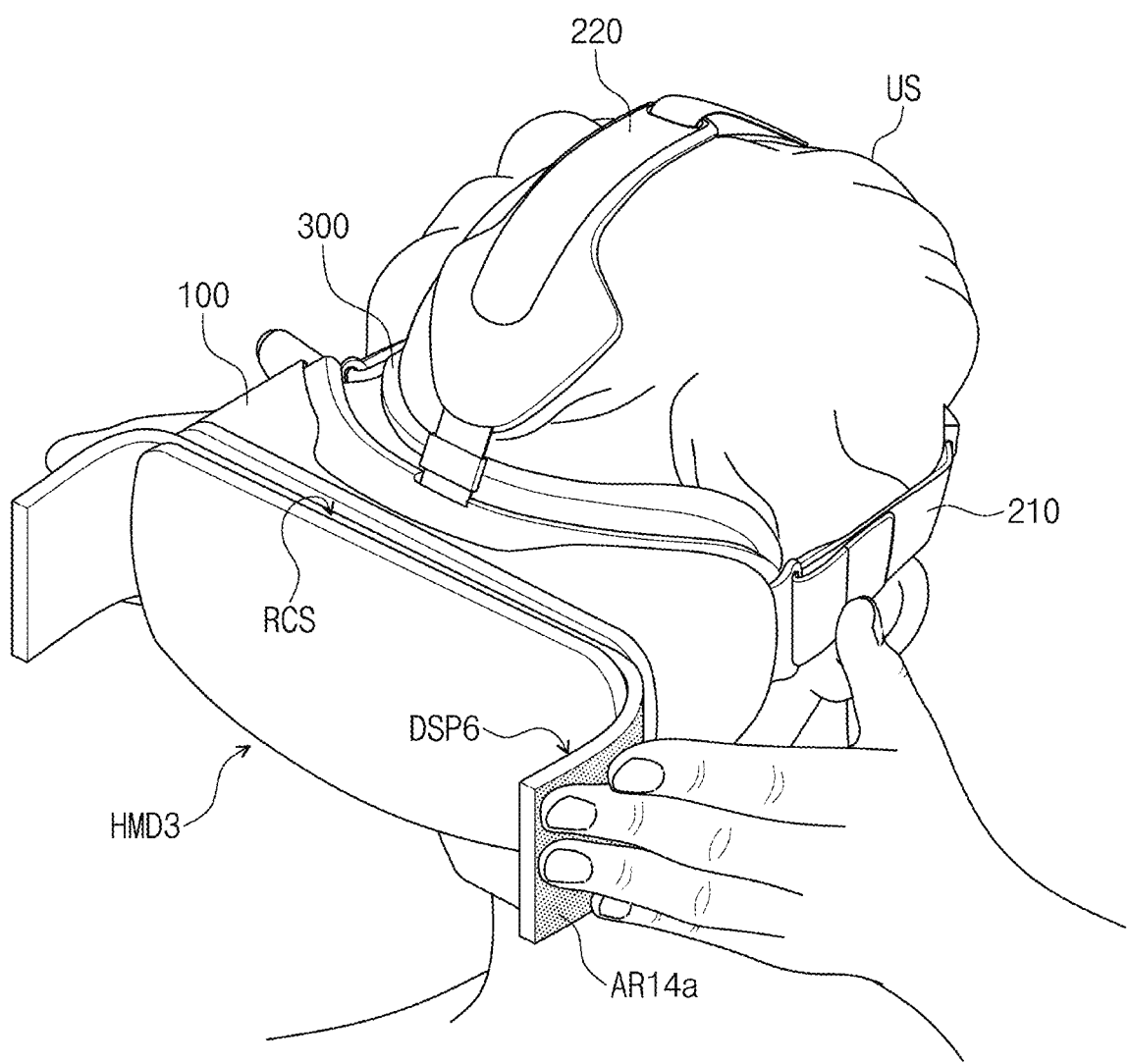
FIG. 26 is a diagram showing a combined structure of the head-mounted device and the display device shown in FIG. 24 in use.

FIG. 24 is a perspective view illustrating a display device according to another embodiment of the invention, FIG. 25 is a plan view illustrating a projection image of a touch screen surface of the display device of FIG. 24, and FIG. 26 is a diagram showing a combined structure of the head-mounted device and the display device shown in FIG. 24 in use.

In an embodiment, a display device DSP6 may include a display panel, an input sensing unit, a driving device structure and a housing, which are substantially the same as those described above, and any repetitive detailed description thereof will be omitted.

In such an embodiment, the display device DSP6 may be curved with respect to an axis parallel to the first direction DR1. Here, the display device DSP6 may be curved in such a way that the active region AR, on which an image is displayed, faces outward. The display panel of the display device DSP6 may be an organic light emitting display panel, and the housing may be provided to have a hinge structure for folding the display device DSP6, or may include or be formed of a flexible material.

A touch screen surface TCS6 may include first and second exposed portions EXP11 and EXP21 and a mounted portion MTP11. The mounted portion MTP11 may be inserted into the reception space RCS of the frame 100 and may not be exposed to the outside. The first and second exposed portions EXP11 and EXP21 may be connected to the short sides of the mounted portion MTP11 in the second direction DR2. When the display device DSP6 is coupled with a head-mounted device HMD3, the first and second exposed portions EXP11 and EXP21 may be bent from the mounted portion MTP11 and may be exposed to the outside.

The first exposed portion EXP11 may be a region that is confined by three sides of the touch screen surface TCS6 (e.g., the short side 11 and portion of the long sides 13 and 14 connected thereto). The second exposed portion EXP21 may be a region that is confined or define by three sides of the touch screen surface TCS6 (e.g., the short side 12 and portions of the long sides 13 and 14 connected thereto). The first and second exposed portions EXP11 and EXP21 and the mounted portion MTP11 may be distinguished from each other, based on an imaginary line extending in the first direction DR1.

As shown in FIGS. 25 and 26, in the case where the display device DSP6 is coupled with the head-mounted device HMD3, the active region AR may be divided into first active regions AR14a and AR14b, which are respectively overlapping the first and second exposed portions EXP11 and EXP21, and a second active region AR24, which overlaps the mounted portion MTP11.

The first active regions AR14a and AR14b (e.g., portions of both curved side regions of the touch screen surface TCS4 of the display device DSP4) may be used to receive a touch input from the user US to control the head-mounted device HMD2.

In an embodiment, as described with above reference to FIGS. 24 to 26, when the display device DSP6 with curved opposite side portions is coupled with the head-mounted device HMD3, the side portions of the display device DSP6 are exposed to the outside. However, the invention is not limited thereto, and in an alternative embodiment, the display device DSP6 may have a curved side portion, and when the display device DSP6 is coupled with the head-mounted device HMD3, the curved side portion of the display device DSP6 may be exposed to the outside and an opposite side portion of the display device DSP6 may be inserted into the reception space of the housing and may not be exposed to the outside. In such an embodiment, the exposed side portion of the display device DSP6 may be used to receive a touch input from a user to control the head-mounted device.

While the inventions have been particularly shown and described with reference to exemplary embodiments thereof, it will be understood by one of ordinary skill in the art that variations in form and detail may be made therein without departing from the spirit and scope of the following claims.

What is claimed is:

1. A head-mounted display system, comprising:
a display device comprising a touch screen surface exposed to an outside, wherein the touch screen surface includes an active region which displays an image and senses a user input; and
a head-mounted device comprising:
a frame, in which a reception space allowing the display device to be mounted therein is defined; and
an optical system disposed in the frame;
wherein the active region of the display device comprises a first active region and a second active region,
wherein the display device is coupled with the head-mounted device,
wherein the first active region is exposed to the outside of the frame, is disposed above the second active region, and receives the user input for controlling the head-mounted device,
wherein the second active region and an entirety of all edges of the display device adjacent to opposing sides and a side joining the opposing sides of the second active region are inserted into the reception space so as not to be exposed to the outside of the frame and closed by the frame,
wherein the head-mounted device itself is electrically controlled based on an input sensing signal that i) corresponds to the user input received through the first active region of the display device and ii) is generated by the display device and received from the display device via wired and/or wireless communication, and
wherein the frame comprises a main frame and a cover portion, and the main frame and the cover portion are coupled to each other to cover the second active region and all the edges of the display device adjacent to the second active region.

2. The head-mounted display system of claim 1, wherein the second active region comprises an image display region, which displays an image to be provided to a user.

3. The head-mounted display system of claim 2, wherein the first active region does not display an image and the second active region displays an image, when the display device is coupled with the head-mounted device.

4. The head-mounted display system of claim 2, wherein the first active region senses the user input and the second active region does not sense the user input, when the display device is coupled with the head-mounted device.

5. The head-mounted display system of claim 1, wherein the user input, which is input to the first active region, controls at least one of volume of the head-mounted device, screen brightness of the head-mounted device, resolution of the head-mounted device, a focal length of the optical system, and an assist device other than the display device and interlocked with the head-mounted device.

6. The head-mounted display system of claim 1, wherein the touch screen surface is flat, and
the first active region is defined by a part of an exposed portion confined by three sides including a long side of the touch screen surface and portions of short sides of the touch screen surface, which is connected to the long side of the touch screen surface.

7. The head-mounted display system of claim 1, wherein
the touch screen surface comprises a front surface having a flat shape, a first side surface bent from an end of the front surface, and a second side surface bent from another end of the front surface opposite to the end, and
the first active region is defined by a portion of one of the first side surface and the second side surface.

8. The head-mounted display system of claim 7, wherein the first and second side surfaces and the front surface meet to form a right angle or an obtuse angle.

9. The head-mounted display system of claim 7, wherein the first side surface and the second side surface have a shape curvedly extending from the front surface.

10. The head-mounted display system of claim 1, wherein
the frame comprises a main frame, and a cover portion which covers at least a portion of a rear surface of the display device, and
the reception space is defined between the main frame and the cover portion.

11. The head-mounted display system of claim 10, wherein
when the display device is coupled with the head-mounted device, the touch screen surface comprises:
a mounted portion, which is inserted in the reception space;
a curved surface curvedly extending from an end of a long side of the mounted portion; and
a flat surface extending from the curved surface to face the mounted portion with the cover portion interposed therebetween, and
the first active region is defined by at least one of a portion of the curved surface and a portion of the flat surface.

12. The head-mounted display system of claim 10, wherein
the touch screen surface is flat, and
the first active region is defined by a portion of a first exposed portion confined by three sides including one of short sides of the touch screen surface and portions of long sides of the touch screen surface, which is connected to the one of the short sides of the touch screen surface.

13. The head-mounted display system of claim 12, wherein the first active region is defined by a portion of a second exposed portion confined by three sides including the other of the short sides of the touch screen surface and portions of the long sides of the touch screen surface, which is connected to the other of the short sides of the touch screen surface.

14. The head-mounted display system of claim 1, wherein
the touch screen surface comprises:
a front surface having a flat shape;
first and second side surfaces bent from two long sides of the front surface; and
third and fourth side surfaces bent from two short sides of the front surface, and
the first active region is defined by a portion of at least one of the third and fourth side surfaces.

15. The head-mounted display system of claim 14, wherein the first active region further comprises a portion of at least one of the first and second side surfaces.

16. The head-mounted display system of claim 1, wherein when the display device is coupled with the head-mounted device, the touch screen surface comprises:
a mounted portion inserted in the reception space; and
a first exposed portion curvedly extending from an end of a short side of the mounted portion, and
the first active region is defined by a portion of the first exposed portion.

17. A head-mounted display system, comprising:
a display device which displays an image and senses a user input; and
a head-mounted device comprising:
a frame, in which a reception space allowing the display device to be mounted therein is defined; and
an optical system disposed in the frame,
wherein the active region comprises a first active region and a second active region,
wherein the display device is coupled with the head-mounted device,
wherein the first active region is exposed to the outside of the frame and is disposed above the second active region,
wherein the second active region and an entirety of all edges of the display device adjacent to opposing sides and a side joining the opposing sides of the second active region are inserted into the reception space so as not to be exposed to the outside of the frame and closed by the frame,
wherein the head-mounted device itself is electrically controlled based on an input sensing signal that i) corresponds to the user input received through the first active region of the display device and ii) is generated by the display device and received from the display device via wired and/or wireless communication, and
wherein the frame comprises a main frame and a cover portion, and the main frame and the cover portion are coupled to each other to cover the second active region and all the edges of the display device adjacent to the second active region.

18. The head-mounted display system of claim 17, wherein the first active region does not display an image and the second active region displays an image, when the display device is coupled with the head-mounted device.

19. The head-mounted display system of claim 18, wherein the first active region senses the user input and the second active region does not sense the user input, when the display device is coupled with the head-mounted device.

* * * * *